United States Patent
Vajen

(10) Patent No.: US 9,224,192 B2
(45) Date of Patent: Dec. 29, 2015

(54) DEVICE AND METHOD FOR THE PROCESSING OF REMOTE SENSING DATA

(71) Applicant: Deutsches Zentrum fur Luft-und Raumfahrt e.V., Cologne (DE)

(72) Inventor: Hans-Hermann Vajen, Klein-Vielen (DE)

(73) Assignee: Deutsches Zentrum für Luft—und Raumfahrt e.V., Köln (DE)

( * ) Notice: Subject to any disclaimer, the term of this patent is extended or adjusted under 35 U.S.C. 154(b) by 93 days.

(21) Appl. No.: 14/092,162

(22) Filed: Nov. 27, 2013

(65) Prior Publication Data

US 2014/0146996 A1    May 29, 2014

(30) Foreign Application Priority Data

Nov. 27, 2012    (DE) .......................... 10 2012 221 667

(51) Int. Cl.
| | |
|---|---|
| *G06K 9/40* | (2006.01) |
| *G06T 5/00* | (2006.01) |
| *G06T 5/20* | (2006.01) |
| *G06T 5/50* | (2006.01) |
| *G06K 9/00* | (2006.01) |
| *G06K 9/62* | (2006.01) |

(52) U.S. Cl.
CPC .............. *G06T 5/002* (2013.01); *G06K 9/0063* (2013.01); *G06K 9/6289* (2013.01); *G06T 5/20* (2013.01); *G06T 5/50* (2013.01); *G06T 2207/10032* (2013.01); *G06T 2207/20012* (2013.01); *G06T 2207/20212* (2013.01); *G06T 2207/30181* (2013.01)

(58) Field of Classification Search
None
See application file for complete search history.

(56) References Cited

U.S. PATENT DOCUMENTS

| | | | | |
|---|---|---|---|---|
| 7,298,922 | B1 * | 11/2007 | Lindgren et al. ............... | 382/294 |
| 8,078,009 | B2 * | 12/2011 | Riley et al. .................... | 382/299 |
| 8,111,307 | B2 * | 2/2012 | Deever et al. ................. | 348/246 |
| 8,224,082 | B2 * | 7/2012 | Kumar et al. ................. | 382/167 |

(Continued)

FOREIGN PATENT DOCUMENTS

| | | |
|---|---|---|
| DE | 102004039634 A1 | 2/2006 |
| EP | 1626256 A1 | 2/2006 |

OTHER PUBLICATIONS

Pohl, C., et al. "Multisensor Image Fusion in Remote Sensing: Concepts, Methods and Applications", International Journal of Remote Sensing, 1998, vol. 19, No. 5, pp. 823-854.

(Continued)

*Primary Examiner* — Soo Park
(74) *Attorney, Agent, or Firm* — The Webb Law Firm

(57) ABSTRACT

The processing of remote sensing data, wherein first image data are processed with the use of second digital image data which, compared with the first image data, have a finer local resolution. The local resolution of the first digital image data is refined temporarily. The local resolution and every pixel of the temporarily refined first image data corresponds to the local resolution and each pixel of the second digital image data. Determining a weighting value for the pixels of the second digital image data which corresponds to a weighting of a image value of the pixel in the ratio of the image value of the pixel to image values of surrounding pixels. A smoothing of the local plot of the image values in the area of the pixel and its environment is implemented such that the weighting value of larger values is based on additional smoothing of image values.

10 Claims, 10 Drawing Sheets

(56) References Cited

U.S. PATENT DOCUMENTS

| | | | |
|---|---|---|---|
| 8,693,771 B2* | 4/2014 | Liu et al. ............... | 382/165 |
| 8,737,733 B1* | 5/2014 | Padwick et al. ......... | 382/167 |
| 2010/0104209 A1* | 4/2010 | Deever et al. ........... | 382/260 |
| 2012/0269430 A1* | 10/2012 | Deskevich et al. ...... | 382/167 |

OTHER PUBLICATIONS

Zhukov, B., et al., "Unmixing-Based Multisensor Multiresolution Image Fusion", IEEE Transactions on Geoscience and Remote Sensing, vol. 37, No. 3, 1999, pp. 1212-1226.

Aanaes, H., et al., "Model-Based Satellite Image Fusion", IEEE Transactions on Geoscience and Remote Sensing, vol. 46, No. 5, 2008, pp. 1336-1346.

Klonus, S. (2008), "Comparison of Pansharpening Algorithms for Combining Radar and Multispectral Data" The International Archives of the Photogrammetry, Remote Sensing and Spatial Information Sciences. vol. XXXVII. Part B6b. Beijing 2008, pp. 189-194.

Lim, J. S. "Image Enhancement" In: EKSTROM: Digital Image Processing Techniques. Academic Press, 1984, pp. 33-41.

Zhang, Y. (2002), "Problems in the Fusion of Commercial High-Tesolution Satellite as well as Landsat 7 Images and Initial Solutions", Symposium on Geospatial Theory, Processing, and Applications, 2002.

Liu, "Smoothing Filter-based Intensity Modulation: a spectral preserve image fusion technique for improving spatial details," International Journal of Remote Sensing, 2000, pp. 3461-3472, vol. 21, No. 18.

* cited by examiner

|      | 6636 | 37  | 38 | 39 | 40  | 41  | 42  | 6643 |
|------|------|-----|----|----|-----|-----|-----|------|
| 4224 | 90   | 87  | 67 | 50 | 30  | 30  | 25  | 22   |
| 4225 | 84   | 84  | 81 | 75 | 47  | 25  | 22  | 22   |
| 4226 | 87   | 84  | 90 | 87 | 73  | 36  | 25  | 25   |
| 4227 | 95   | 92  | 95 | 90 | 90  | 70  | 45  | 28   |
| 4228 | 101  | 101 | 92 | 92 | 87  | 81  | 47  | 28   |
| 4229 | 101  | 95  | 87 | 84 | 70  | 64  | 39  | 36   |
| 4230 | 90   | 90  | 87 | 70 | 45  | 50  | 59  | 61   |
| 4231 | 87   | 78  | 78 | 53 | 61  | 70  | 87  | 92   |
| 4232 | 73   | 61  | 67 | 78 | 84  | 101 | 104 | 106  |
| 4233 | 59   | 73  | 87 | 98 | 104 | 118 | 118 | 109  |

Fig. 7

|      | 6636   | 37     | 38     | 39     | 40     | 41     | 42     | 6643   |
|------|--------|--------|--------|--------|--------|--------|--------|--------|
| 4224 | 1.0345 | 1.1044 | 1.0050 | 1.0067 | 0.7895 | 1.0547 | 1.0227 | 0.9706 |
| 4225 | 0.9594 | 1.0027 | 1.0340 | 1.1250 | 0.9338 | 0.7188 | 0.8534 | 0.9296 |
| 4226 | 0.9584 | 0.9545 | 1.0411 | 1.0755 | 1.1079 | 0.7483 | 0.7550 | 0.9298 |
| 4227 | 0.9828 | 0.9892 | 1.0389 | 1.0176 | 1.1473 | 1.1372 | 1.0519 | 0.8968 |
| 4228 | 1.0033 | 1.0582 | 1.0000 | 1.0521 | 1.0755 | 1.2293 | 0.9658 | 0.7730 |
| 4229 | 1.0111 | 1.0130 | 0.9812 | 1.0588 | 0.9798 | 1.0627 | 0.7548 | 0.7660 |
| 4230 | 0.9643 | 1.0214 | 1.0845 | 0.9921 | 0.7143 | 0.8257 | 0.9516 | 0.9274 |
| 4231 | 1.0398 | 0.9873 | 1.0604 | 0.7657 | 0.8971 | 0.9531 | 1.0726 | 1.0311 |
| 4232 | 0.9955 | 0.8281 | 0.8960 | 0.9887 | 0.9857 | 1.0732 | 1.0343 | 1.0106 |
| 4233 | 0.7597 | 0.8854 | 0.9899 | 1.0328 | 1.0065 | 1.0695 | 1.0361 | 0.9543 |

Fig. 8

|      | 3314 | 15 | 16 | 17 | 18 | 19 | 20 | 21 | 3322 |
|------|------|----|----|----|----|----|----|----|------|
| 2108 | 31   | 33 | 31 | 35 | 31 | 29 | 26 | 17 | 17   |
| 2109 | 31   | 35 | 31 | 35 | 35 | 33 | 28 | 19 | 17   |
| 2110 | 29   | 29 | 36 | 38 | 38 | 35 | 22 | 15 | 17   |
| 2111 | 31   | 31 | 28 | 38 | 47 | 45 | 31 | 15 | 19   |
| 2112 | 28   | 28 | 26 | 35 | 42 | 50 | 36 | 15 | 19   |
| 2113 | 26   | 29 | 29 | 35 | 42 | 50 | 45 | 29 | 19   |
| 2114 | 31   | 35 | 35 | 33 | 40 | 47 | 40 | 26 | 17   |
| 2115 | 31   | 35 | 36 | 36 | 38 | 36 | 33 | 29 | 28   |
| 2116 | 31   | 35 | 33 | 36 | 35 | 33 | 31 | 31 | 29   |
| 2117 | 31   | 33 | 29 | 28 | 26 | 29 | 29 | 24 | 26   |

Fig. 9

|      | 6636    | 37      | 38      | 39      | 40      | 41      | 42      | 6643    |
|------|---------|---------|---------|---------|---------|---------|---------|---------|
| 4224 | 44.0000 | 48.0000 | 47.0625 | 41.1875 | 33.3125 | 23.4375 | 18.6250 | 18.8750 |
| 4225 | 44.0000 | 48.0000 | 48.1875 | 44.5625 | 38.4375 | 29.8125 | 23.8750 | 20.6250 |
| 4226 | 43.4375 | 47.3125 | 47.8750 | 45.1250 | 39.8750 | 32.1250 | 25.8125 | 20.9375 |
| 4227 | 42.3125 | 45.9375 | 46.1250 | 42.8750 | 37.6250 | 30.3750 | 24.4375 | 19.8125 |
| 4228 | 40.6875 | 43.0625 | 42.7500 | 39.7500 | 35.3750 | 29.6250 | 25.0000 | 21.5000 |
| 4229 | 38.5625 | 38.6875 | 37.7500 | 35.7500 | 33.1250 | 29.8750 | 27.5000 | 26.0000 |
| 4230 | 36.7500 | 35.7500 | 34.5625 | 33.1875 | 31.7500 | 30.2500 | 29.1875 | 28.5625 |
| 4231 | 35.2500 | 34.2500 | 33.1875 | 32.0625 | 31.2500 | 30.7500 | 30.0625 | 29.1875 |
| 4232 | 32.5625 | 32.1875 | 31.6250 | 30.8750 | 30.1875 | 29.5625 | 29.0000 | 28.5000 |
| 4233 | 28.6875 | 29.5625 | 29.8750 | 29.6250 | 28.5625 | 26.6875 | 26.0000 | 26.5000 |

Fig. 10

|      | 6636    | 37      | 38      | 39      | 40      | 41      | 42      | 6643    |
|------|---------|---------|---------|---------|---------|---------|---------|---------|
| 4224 | 45.5172 | 53.0099 | 47.2978 | 41.4639 | 26.2993 | 24.7192 | 19.0483 | 18.3199 |
| 4225 | 42.2132 | 48.1273 | 49.8279 | 50.1328 | 35.8920 | 21.4307 | 20.3761 | 19.1725 |
| 4226 | 41.6298 | 45.1619 | 49.8442 | 48.5342 | 44.1785 | 24.0381 | 19.4893 | 19.4667 |
| 4227 | 41.5830 | 45.4436 | 47.9184 | 43.6291 | 43.1675 | 34.5420 | 25.7070 | 17.7678 |
| 4228 | 40.8222 | 45.5690 | 42.7500 | 41.8208 | 38.0476 | 36.4193 | 24.1438 | 16.6196 |
| 4229 | 38.9914 | 39.1917 | 37.0404 | 37.8529 | 32.4553 | 31.7491 | 20.7581 | 19.9149 |
| 4230 | 35.4375 | 36.5164 | 37.4826 | 32.9262 | 22.6786 | 24.9771 | 27.7752 | 26.4879 |
| 4231 | 36.6544 | 33.8165 | 35.1928 | 24.5487 | 28.0331 | 29.3079 | 32.2451 | 30.0962 |
| 4232 | 32.4145 | 26.6530 | 28.3356 | 30.5271 | 29.7546 | 31.7265 | 29.9934 | 28.8019 |
| 4233 | 21.7927 | 26.1760 | 29.5728 | 30.5963 | 28.7468 | 28.5419 | 26.9385 | 25.2884 |

Fig. 11

| | | | | | | | | |
|---|---|---|---|---|---|---|---|---|
| 100 | 100 | 100 | 100 | | | 1.06 | 100 | 100 | 100 |
| 100 | 100 | 100 | 100 | → | | 1.06 | 100 | 100 | 100 |
| 100 | 100 | 100 | 100 | | | 1.06 | 100 | 100 | 100 |
| 10 | 100 | 100 | 100 | | | 0.106 | 100 | 100 | 100 |

Fig. 15

| | | | | | | | | |
|---|---|---|---|---|---|---|---|---|
| 10 | 100 | 100 | 100 | | | 0.139 | 1.39 | 1.39 | 1.39 |
| 10 | 100 | 100 | 100 | → | | 0.139 | 1.39 | 1.39 | 1.39 |
| 10 | 100 | 100 | 100 | | | 0.139 | 1.39 | 1.39 | 1.39 |
| 10 | 10 | 100 | 100 | | | 0.139 | 0.139 | 1.39 | 1.39 |

Fig. 16

DEVICE AND METHOD FOR THE PROCESSING OF REMOTE SENSING DATA

CROSS-REFERENCE TO RELATED APPLICATION

This application claims priority to German Patent Application No. 102012221667.7 filed Nov. 27, 2012, the disclosure of which is hereby incorporated by reference in its entirety.

BACKGROUND OF THE INVENTION

1. Field of the Invention

The invention relates to a device and a method for the processing of remote sensing data. The invention relates in particular to remote sensing image data of objects on the earth's surface and/or the atmosphere, where the image data is obtained from remote sensing satellites, aircraft or other flying objects (e.g. balloons).

2. Description of Related Art

In past years satellite systems have been additionally equipped with sensor packages, where several initial sensors with a local coarse resolution (because of the differently designated spectral ranges also called multi-spectral sensors) were extended with a second local fine resolution, panchromatic sensor, where the multi-spectral sensors are more sensitive to incident radiation in a narrower spectral range in each case (wavelength range) than the panchromatic sensor. On the one hand, this trend follows from the fact that many applications require a high spectral resolution for satellite data with a fine local resolution, on the other hand, however, the transfer quantity in case of transfer of remote sensing data from a satellite to the ground station is limited. In particular in the areas of geology, the land utilization mapping and/or the updating of maps, e.g. for the agricultural and forest economy, the data for applications are used, which are subsumed into the term "change detection". Another region relates to the monitoring of natural catastrophes.

Typically the data (image data) of the multi-spectral bands in the remote sensing are used for the derivation of the the-matic information (e.g. the properties of the reflecting surface), where the data of the panchromatic channel are used for the extraction of spatial information. The objective is also to have available for further processing the thematic information with maximum high resolution at least corresponding to the local resolution of the panchromatic data. The panchromatic image data can be employed for this refinement of the local resolution of the multi-spectral data since, they were generally recorded at the same time and represent the same remote sensing objects.

With the measuring data of the multi-spectral bands and the panchromatic band and/or the channels, it involves digital image data. The remote sensing images are nowadays mostly digital measuring data of radiation-measuring sensors in different spectral ranges, with which the images are two-dimensional. The arrangement of the image elements (pixels) is also designated as image matrix or image array. Every single measurement of a sensor element of the image-providing device produces a section or a small, almost point-like section of the image. The section is generally regarded as quadratic, so that the edge length of the section, which is also designated as a resolution, can be calculated from the square root of the section size. However, the sections examined can also indicate a different edge length in the different spectral ranges.

The single measurements which must be implemented for the formation of an image matrix can be implemented either in series (which means one after each other) or in parallel (which means simultaneously). The type of origin of the image matrices is of subordinate importance for the process of refinement of the local resolution. Furthermore, not only one image matrix is usually recorded but image matrices are continuously recorded. Preferably the image data of the multi-spectral channels are therefore refined for every recording time point or every image matrix.

The trend is noted that the sections to be measured become increasingly smaller, i.e. the spatial resolution becomes increasingly better such that the entire surface areas examined become increasingly larger, i.e. the total number of sections (pixels) become ever greater and the number of examined spectral ranges also increases. The refinement of the local resolution of the multi-spectral channels targeted in this case determines an exponential rise of the data quantity to be processed. In many cases, it is required that the data be processed with the speed (rate) with which it is recorded (i.e. digitally stored). Processing in real time is referred to in this case.

A useful application of the refined multi-spectral image data is e.g. disaster management, for example in the case of forest fires on a large surface area, volcanoes, tsunamis and earthquakes. In this case, the processing of fine-resolution, multi-spectral data represents a significant advantage compared to the utilization of low-resolution data.

The digital image data must not necessarily be obtained directly from digital cameras, as designated above. Rather it is also possible to use other remote sensing processes, at least for a part of the multi-spectral channels, such as e.g. radar systems with the possibility of the generation of locally fine-resolution data which, however, also in case of cameras, can be stored in the form of digital image data with pixels arranged in lines and columns. In the case of satellites, the fine and coarse resolution digital image data do not necessarily have to be obtained from the sensors of only one satellite. For example, a sensor of a further satellite and/or a radar system can be used in addition.

Different processes for the refinement of the resolution of multi-spectral digital image data are known. In this case, it involves statistical methods and methods which are based on color space transformations, or of methods which are based on physical considerations. The objective of all refinement methods is to predict measured values (pixels) at image locations, which have actually not been measured. From the multi-spectral channel there are only pixels present which correspond to a large local area in each case. Furthermore, the local finer resolution image information from the panchromatic channel is present only with a smaller spectral resolution. The result of the refinement of the multi-spectral image data can therefore be correct with a certain probability only, however, not with ultimate certainty.

For example, from EP 1 626 256 A1, a method for the processing of multi-spectral remote sensing data is known. In a local area or section of the panchromatic measuring data, a local distribution of a radiance of a reflection factor recorded in the panchromatic measuring data, or an equivalent radiation extent is determined and, considering a balance of at least a part of the radiation energy recorded through the measuring data or a balance of the radiation energy equivalent size, is transmitted to a corresponding local area or section of the multi-spectral measuring data, so that the local resolution of the multi-spectral measuring data is refined. In spite of the consideration of the balance of the radiation energy, the result of the refinement with this process is also correct with a certain probability only, i.e. it corresponds to the actual conditions in case of directly-refined measurement with the certain probability only.

The different known processes are differentiated not only through the process principles which underlie them, but also through different resource requirements on main memory and processor performance of a data processor or data processor system. In addition, there are processes which can be virtually realized better or worse through digital data processors.

Since, with the image data, it involves digital image data, the data processing time required for the refinement is a significant criterion as to whether or not the process is suited for the appropriation of the refined data in real time.

Some known processes use so-called wavelet transformations for the refinement, the method of main-component analysis or other transformations which lead to inconsistent, non-color-retention results. Other known processes require so-called classified image data for the refinement of the multispectral data. This requires an extensive preprocessing of data with additional data for classification.

The publication of J. G. Liu "Smoothing Filter-based Intensity Modulation: a spectral preserve image fusion technique for improving spatial details", published in Int. J. Remote Sensing, 2000, Vol. 21, No. 18, Pages 3461-3472 describes a data fusion technology to spatially integrate lower-resolution, multi-spectral images with spatially higher-resolution panchromatic images. A Pixel Block Intensity Modulation (PBIM) technology is further developed to a Smoothing Filter-based Intensity Modulation (SFIM) technique. For every pixel of the high-resolution image, a local average value is calculated with a smoothing fold filter. The filter core size is decided based on the resolution ratio between the higher and lower resolution images.

In order to enable the finer and coarser resolution image data to be fused with each other, the data should be co-registered as far as possible, i.e. it should be exactly known over the entire recorded image field which location in one image corresponds to which location in the other image. Since an exact co-registration frequently does not succeed in practice, however, Liu proposes in his publication to select the size of the filter core by means of a statistical correlation analysis of the different images. A smearing of edges not matching completely with each other is reduced through enlargement of the filter core, i.e. the resulting image is sharpened at the edges of structures represented. On the other hand, according to Liu, a too large core size leads to an edge improvement which is not absolutely desired. The edges become apparently sharper, however, because of the strong smoothing effect, no longer correspond to reality. In particular, the histogram function of the initial, non-refined image is modified by the smoothing in the refined resolution image. In local areas, a change of the integral of the image values over the local area occurs through the smoothing.

In addition, the application of a smoothing filter increases the computation time for the data fusion. This is contrary to the requirement that the data is refined with regard to its resolution, as far as possible in real time at the location of its extraction (e.g. in a satellite), and is transmitted to a remote receiving station, in particular on the planetary surface, or the resolution improvement is implemented in real time immediately with the data reception on the planetary surface. If further, new image data result through the on-going observation of the planetary surface than are capable of being refined, a transfer in real time is no longer possible.

SUMMARY OF THE INVENTION

It is an object of the invention to propose a method and a device for the processing of remote sensing data which, with the use of image data of a measurement channel with locally finer-resolution image data, will enable a refinement of the local resolution of first image data with a low-level of data processing effort, in particular in real time. In addition, refined image data should be received in this case, in which edges of mapped structures, with imprecise co-registration of the coarse and fine resolution image data, are sharp. Furthermore, an object of this invention is to propose a corresponding computer program for the implementation of the process.

In the literature, the fusion of images has been designated as their linking according to a predetermined specification. This means that every image element (pixel) of one image, according to this specification, is linked with an image element of the other. Both image elements are to be allocated exactly (for example over an addressing specification). This allocation is e.g. provided if both images are co-registered exactly and the image elements to be linked can therefore be found at identical addresses. In practice, this co-registration is first established and the data fused in a second step. Also the resolution improvement of a coarse-resolution image by means of a finer-resolution image is therefore an image fusion (data fusion). In earth observation, the resolution improvement is implemented either with data of a sensor system, which supplies the image data in several channels of different spatial resolution, or with data of different sensors whose image data has a different spatial resolution.

This invention is based on the basic idea that the method of refinement of the local resolution within an image to be refined, which is processed with the use of a finer-resolution image concerning at least in part the same local image region, is varied, i.e. the method is implemented for the refinement of the same image differently for local sections of the image than for other local sections of the image. How the process is implemented is determined preferably from the local dependence on the image values (e.g. gray shades or color values) in local sections of the finer-resolution image (e.g. image defined by the panchromatic image data). In particular, an additional smoothing of the local change of the image values is carried out in a section of the image, if the gradient of the image values is large (i.e. the image values are changed significantly over small local areas or at short distances). This is the case in particular at edges of structures recorded by the image, i.e. at edges of the image structures. The image values at such edges can change abruptly from one pixel to its adjacent pixel, while e.g. both pixels are associated with a local section of the image with coarser resolution, in which the image values indicate only small differences in each case. In particular, it is also possible to smooth the local plot of the image values all the more, the greater the gradient of the image values in a local section, in particular at the location of the respective pixel to be refined of the coarse resolution image data.

This smoothing is carried out preferably only for the determination or with the determination of weighting values which correspond to the weighting of an image value of a pixel in the relationship of the image value of the pixel to image values of surrounding pixels in a defined, in particular predetermined local environment of the pixel. If the pixel has e.g. a small gray shade in comparison with the gray shades of its surrounding pixels, the weighting of the image value of the pixel is small. If the plot of the image values is constant in the environment, including the pixel, the weighting of the image value of the pixel is average. A corresponding weighting value can be e.g. 1 in this case. The weighting value in particular can have a value near 1 if the plot of the image values is not constant in the environment, however, the image value of the pixel has a high content of the total of the image values in the environment. In other words the weighting value can be small if the image value of the pixel has a small content of the total of the image values in its environment.

It is preferred not to implement any smoothing of the local plot of the image values for the purpose of the determination of the weighting value in the area of the pixel and its environment, if the local plot of the image values, including the pixel, is constant in the environment, if the plot is almost constant or if the difference of the image value of the pixel to the image values of the surrounding pixels and/or to the image value, or values, of a part of the surrounding pixels is greater than/equal to, or greater than, a specified limit value. The cases linked with "or" in the preceding sentence are different attributes of the process. The consideration of the differences of the image values and the analysis, as to whether the local plot of the image values is constant, is approximately constant or indicates larger gradients, is preferably referred to the finer-resolution image data which are employed for the refinement of the coarser-resolution image data. From the finer-resolution image data, information can be determined about the local plot of the image values with higher local precision.

In particular, according to the image matrix of the finer-resolution image data or according to a section or several sections of this image matrix, a matrix of weighting values can be determined which is employed for the refinement of the image data of coarser resolution. In this case, every weighting value of the weighting value matrix is employed for the formation of a corresponding image value of the refined resolution image data. For example, refined image data can first be formed temporarily from the image data of coarser resolution, which in particular have the same local resolution as the finer-resolution image data. In a further process step, the weighting values can then be employed in order to form the finally refined image data from the temporarily refined image data from the weighting value matrix. Preferably every weighting value from the weighting value matrix corresponds in this case to an image from the matrix of the temporarily refined image data.

In particular with the formation of the previously designated weighting value matrix, the above described principle is employed, according to which the weighting values are determined in a different manner, dependent on the local plot of the image values in an environment of the respective pixel, to which the weighting value should be allocated. At any rate, in the case of environments and local areas in which the gradient of the image values is large (e.g. at edges of image structures), a smoothing is carried out for the purpose of the formation of the weighting value. On the other hand, in particular in environments or local sections in which the gradient of the image values is 0 or almost 0 (thus the image values in the local section are constant), the formation is carried out without smoothing for the purpose of the determination of the weighting values. If a smoothing is not carried out for the purpose of the determination of weighting values in a section of the image data, this does not exclude the possibility that, in a preceding step of the preparation of the image data for the data fusion, a smoothing is carried out over the entire image data, e.g. in order to dampen the effect of statistical outliers. However, such a smoothing is generally possible with simple resources i.e. with short computation time. On the other hand, if a smoothing was carried out in each case with the formation of the weighting values of every individual pixel, this would considerably increase the computation time.

Therefore the invention has the advantage that, in the area of large gradients of the image values, a smoothing can and will be carried out, so that the effects of the edge smearing, as described by Liu in the publication, can be avoided in par-ticular. Simultaneously, the smoothing is implemented only in the necessary scope and in particular not in sections of the image in which the image values are constant or almost constant. Therefore high levels of computation outlay are avoided and in particular a processing of the image data can be implemented in real time, if a processing in all image areas was not possible in real time in case of smoothing for the purpose of the formation of the weighting values.

In particular the following is proposed: A method for the processing of remote sensing data, wherein first digital image data, which are or were obtained by remote sensing and which are image data of at least a first measurement channel, are processed with the use of second digital image data, which are or were obtained by remote sensing from a registration range in common with the first image data, and which, in comparison with the first image data, are image data with a finer local resolution of at least a second measuring channel, wherein a) the local resolution of the first digital image data, at least for a section of the common registration range, is temporarily refined without utilization of image values of the second digital image data, in particular by interpolation between pixels of the first digital image data, in such a way that the local resolution of the temporarily refined first image data corresponds to the local resolution of the second digital image data and that one pixel of the temporarily refined first digital image data corresponds to every pixel of the second digital image data, b) for a plurality of pixels of the second digital image data in the section of the common registration range, in particular for every pixel of the second digital image data in the section, one weighting value for the pixel is determined in each case, which corresponds to a weighting of an image value of the pixel in the ratio of the image value of the pixel to image values of surrounding pixels in a local environment of the pixel, c) dependent on how large the difference of the image value of the pixel to the image values of the surrounding pixels and/or to the image value, or values, of a part of the surrounding pixels is, before or with the determination of the weighting value, a smoothing of the local plot of the image values in the area of the pixel and its environment is implemented, such that the weighting value in case of larger values of the difference is based on an additional smoothing of image values in the area of the pixel and its environment, and in case of smaller values of the difference not, or such that the weighting value in case of larger values of the difference is based on a stronger smoothing of image values in the area of the pixel and its environment than in case of smaller values of the difference, d) every pixel of the temporarily refined first digital image data which corresponds to a pixel of the plurality of pixels of the second digital image data is weighted with the weighting value of the corresponding pixel of the second digital image data, and in this way refined first image data are obtained, which were obtained using information about the finer-resolution second digital image data.

In particular, the method for the processing of remote sensing data can have at least one of the following feature or an arbitrary combination of the following features, according to which the local resolution of the first digital image data, at least in a local section, is refined by interpolation between pixels of the first digital image data, for every pixel of the second digital image data, an average value of the pixels in a local environment of the pixel is calculated and the quotient of the pixel and the average value is formed, every pixel of the first digital image data (with reference to the location) is multiplied by the corresponding weighting value or quotient, and in this way refined first image data are obtained (not only temporarily), which include information about the finer resolution second digital image data.

The quotient is formed as weighting value in this case, and this is dependent on the difference of the image value of the pixel to the image values of the surrounding pixels and/or to the image value, or values, of a part of the surrounding pixels.

Generally it applies (in particular dependent on the question as to whether it involves a surface pixel or a contour pixel) that the applicable methods of the weighting value formation can be stipulated by the user, or are capable of being be stipulated by the user, or can be stipulated automatically after analysis of the image characteristics.

If the division of the methods in the publication of Liu are followed, which differentiates between SFIM (Smooth Filter Intensity Modulation) processes and PBIM (Pixel Block Intensity Modulation) processes, then e.g. these two methods can be employed on the same images, i.e. both methods are employed during a process of the refinement of the local resolution. In particular, the PBIM method can be employed in image areas which indicate constant or almost constant image values (which means so-called surface pixels). Furthermore, the SFIM method can be employed in image areas with large gradients of the image value as a function of the location. Likewise, a utilization of the one or the other method in combination with another method is possible in each case. Furthermore, it is possible to employ not only two environmental variables for the formation of the weighting values, but to employ several environment variables and to select the environment variables dependent on the image characteristics.

In many cases, at least one first spectral range, in which incident radiation is recorded by the first digital image data and which is allocated to the first measurement channel or to one of the first measuring channels, is narrower than a second spectral range, in which incident radiation is recorded by the second digital image data. However, this is not a compelling prerequisite for the process presented here. If this is the case, the first spectral range or the first spectral ranges can be included completely in the second spectral range. However, this is also not a necessary feature compelling. For example, the spectral ranges also cannot indicate any overlapping.

With the second digital image data, it involves in particular so-called panchromatic image data. By panchromatic is understood that the corresponding measuring channel of the panchromatic sensor detects the incident electromagnetic radiation in a wide spectral range. The width of the spectral range in many cases includes the range of the electromagnetic radiation observed by the human eye and is frequently extended by the near infrared range (to approx. 1100 nm wavelength). The spectral range is wide in relation to the spectral measuring ranges of at least one sensor and preferably a majority of so-called multi-spectral sensors, which record the first digital image data. In case of a single spectral range in which the first digital image data are recorded, it does not involve multi-spectral image data in the actual sense. Nevertheless, multi-spectral image data are referred to in the following, since this is an introduced specialist term. The spectral measuring range of the panchromatic sensor in this case preferably encompasses at least one spectral range of the multi-spectral sensor or sensors. The spectral measuring ranges of the multi-spectral sensors can overlap in this case and/or gaps can be present within the spectral measuring range of the panchromatic sensor, in which none of the multi-spectral sensors can detect radiation. Preferably, none of the spectral measuring ranges of the multi-spectral sensors extend beyond the limits of the spectral measuring range of the panchromatic sensor. Indeed a satellite can e.g. also indicate further sensors, whose spectral measuring ranges extend beyond the range of the panchromatic sensor or lie outside of this. However, these multi-spectral sensors are preferably not considered in the refinement of the local resolution.

By a channel and/or a measuring channel is meant measured values referred to a single continuous spectral range, which can change in particular with the passage of time. The measured values can correspond to a solid angle range, which is constant time-related, recorded by a measurement sensor (where the alignment of the solid angle range can change with time) and/or can be spatially subdivided into a number of image elements (pixels) and result in an image composed of the image elements.

A common registration (co-registration) of the first and the second image data is prerequisite for the refinement. By common registration is meant that it is known which location in the first image data corresponds to which location in the second image data. The common registration should be as exact as possible, since otherwise corruption can result with the refinement of the image data. For the co-registration, known processes can be employed which are not dealt with in more detail here. For example, characteristic image sections can be referred to in the first images on the one hand, and the second images can be referred to for the co-registration on the other hand. A calibration of the sensors which generate the first and the second image data, or a calibration of the generated image data is not required for the implementation of the refinement. Such a calibration can also be implemented after the refinement. By the calibration it is achieved in particular that the spectral radiant flux density of the radiation incident on the sensor element can be allocated to the respective image values of the pixels.

In particular, the refinement of the first image data is possible in at least three process steps, where two of these three process steps can be implemented in parallel with each other, since they concern only one type of the image data. For example, the step designated as a fourth process step in the following processes only first image data, and the process step designated as a fifth step in the following processes only second image data. First the step designated as a sixth process step in the following requires the result, or at least partial results of the fourth and fifth process step. These steps are designated as a fourth, fifth and sixth process step only, because before these process steps several other process steps are still capable of being implemented optionally. In particular, if several first images from different measuring channels and/or with use of the results of the same implementation of the fifth process step should be resolution-refined in parallel, a fourth process step in each case can be implemented for each of the first image data in each case and/or a sixth process step can be implemented for each of the first image data.

As a first process step, the local lower-resolution image data can be processed. In particular, prominent object limits of the objects recorded by the remote sensing can be detected in this step. This step should always be implemented when an inadequate co-registration of the low and high, as well as coarser and finer, resolution image data is present, which thus impairs the quality of the data fusion. In particular for the case where several coarse-resolution first (for example multi-spectral) images, that is the corresponding image data, should be fused with the same fine-resolution (for example panchromatic) second image data in each case, the first image data best suited for this are preferably used for the detection of the prominent object limits, in particular when the multi-spectral image data already indicate a very good co-registration with respect to each other (for example because they correspond to channels of the same sensor). In addition, or as an alternative, in this first process step, a contrast improvement of the image contrasts in the first image data, a noise reduction of the first image data and/or a filtering of the first image data, can take place.

As a second process step, which is capable of being implemented in addition to the first process step and/or in addition to the third process step, or also without the first and third process step, the locally finer-resolution, second image data can be processed. In particular, prominent object limits of objects recorded by the remote sensing can be detected in this step. This step should always be implemented when an inadequate co-registration of the coarser and finer-resolution image data is present, which thus impairs the quality of the data fusion. In addition, or as an alternative, in this second process step a contrast improvement of the image contrasts in the second image data, a noise reduction of the second image data and/or a filtering of the second image data, can take place.

In the third process step, to be implemented in particular after the first and second process step, if prominent object limits have been detected in the preceding process steps in each case, the co-registration of the first and second image data can be improved on the basis of the detected prominent object limits. In particular, the coordinates of identical points of the prominent object limits, identified in the preceding process steps, are compared for this purpose. For each of the identified points which should be distributed in their location as far as possible uniformly over the surface of the images, the shift is determined. These points are in particular the basis for the interpolation and/or optimization of the shift for all image points, and through that the improvement of the co-registration.

In the third process step it can be determined, as an alternative or in addition to the improvement of the co-registration for pixels in the second image data, in particular for all pixels in the second image data for which a corresponding pixel should be generated in the refined first image data, how large the difference is of the image value of the pixel to the image values of the surrounding pixels and/or to the image values of a part of the surrounding pixels. Formulated more generally, the information, on whose basis it is determined in which procedure the weighting value is determined for the respective pixel, can be determined in the third process step for the pixels in the second image data. It does not need an explicit determination of the procedure if the determined information enables the implementation of the respective allocated procedure immediately. For example, the determined information can exist in that the respective pixel is either a so-called block pixel (that is part of a block, i.e. environment of pixels with constant image values or almost constant image values which can also be designated as a surface pixel) or an edge pixel (which can also be designated as a contour pixel) at an edge (that is boundary) of an image structure or of an image object, and therefore have surrounding pixels in the environment of the pixel strongly deviating from the image value of the pixel. Basically it is also possible that the determined information has further states differing from the status of the "block pixel" and the "edge pixel", for example the status of a "gradient pixel" in an environment in which the image values change with almost constant gradients.

In particular in one of the first to third process steps, or in an additional process step, the second and/or at least one first channel can be calibrated before the refinement of the resolution channel or after that, and optionally can also be subjected to a sun-position and/or atmosphere correction. The finer-resolution remote sensing data can be evaluated quantitatively and/or processed further in another manner.

The first and second image data include picture information of at least one common recorded range, that is at least one part of the recorded local area of the second image data is also represented in the first image data and vice versa. In particular, both measuring data include an almost congruent representation of objects on the earth's or planetary surface in different scales.

The fourth process step, which can be implemented simultaneously with the fifth process step, where the fourth and fifth process steps can also be implemented after each other, has as its objective a provisional refinement of the local resolution of the first image data. This provisional refinement can also be designated as a geometrical transformation. A refinement can be produced in the fourth process step in particular by interpolation, at least in a local section, of the first image data between the existing pixels, i.e. further pixels are generated between the existing pixels. In this way, a local resolution of the first image data, which corresponds to the local resolution of the second image data, is generated. Therefore, after the interpolating, every pixel of the second image data has a corresponding pixel in the first image data, at least in the local section in which interpolation was carried out. The provisional refinement of the local resolution can be implemented separately for different first image data, e.g. separately for three or four different spectral ranges, in which first image data were recorded. In particular in this case, the interpolations can be implemented for the individual spectral areas separately and time-related in parallel.

On edges of the first image data or the local area of the first image data to be interpolated, an extrapolation can occur in addition. In this way e.g. new edge pixels of the provisionally refined resolution area of the first image data can be generated.

In an especially simple case, the interpolation is implemented such that the value of the next adjacent pixel is allocated to a pixel to be newly generated between several other existing pixels. In another case, a value is allocated to the pixels to be newly generated which is calculated from the weighted values of several adjacent pixels. For example, the weighting can depend on the separation distance to the adjacent pixel which already exists. This is the case e.g. with the application of the method of bilinear interpolation, with which it involves a recognized standard procedure of the digital image processing. However, more complex interpolation models can also be employed. However, no precise knowledge exists in all cases about which value the pixel new to be generated would have been provided with, if it had been generated e.g. with the aid of a correspondingly finer resolution array of radiation-sensitive sensor elements.

The fifth process step has the objective of preparing the information of the finer resolution second image data for application to the first image data. This preparation, i.e. the implementation of the fifth process step with several different first image data records, must be implemented in this case only once in total. The result of the fifth process step is usable in a similar manner for all different spectral ranges of the first image data. In the fifth process step, which can be implemented simultaneously with, or after, the fourth process step, for every pixel of the second image data, for which a weighting value is to be determined, the weighting value (in particular through quotient formation from an average value) is calculated with respect to all pixels in a local environment of the pixel. Thus a field (matrix) of directional values is formed, in which the weighting values are arranged in columns and rows, where every weighting value expresses the weighting of the corresponding pixel value (with reference to the location in the second image) relating to the image values in its environment. Generally, in case of environments which are not too small or not too great variations of the image values of the pixels, in particular in the case of the quotient, the value of the quotient will be near 1.

It is preferred that the weighting value is determined on the basis of an additional smoothing of image values in the area of the pixel and its environment exactly if the difference of the image value of the pixel of the second image data to the image values of the surrounding pixels, and/or to the image value, or values, of a part of the surrounding pixels, is greater than/equal to, or greater than, a specified limit value.

As a result of utilization of a specified limit value, it can be determined and differentiated in a simple way for which pixels an additional smoothing of the determination of the weighting value is to be implemented.

In particular, an average value of the image values of the corresponding pixel of the second image data is determined in case of the determination of the weighting value for every pixel of the temporarily refined first image data and its surrounding pixel in the local environment of the pixel. Preferably, the quotient is determined as the weighting value of the pixel, by division of the image value of the pixel through the allocated average value.

The formation of an average value and the subsequent quotient formation represent a simple and proper determination of the weighting value.

In particular, the average value of the image values is determined in a local area of the second image data, which corresponds to the local area of the corresponding pixel of the first image data not yet refined, if the difference of the image value of the pixel of the second image data to the image values of the surrounding pixels and/or to the image value, or values, of a part of the surrounding pixels is smaller than, or smaller than/equal to, a specified limit value.

In particular, the average value of the image values is determined in a local area of the second image data, which is greater than the local area of the corresponding pixel of the first image data not yet refined, and which includes the local area of the corresponding pixel of the first image data, if the difference of the image value of the pixel of the second image data to the image values of the surrounding pixels and/or to the image value, or values, of a part of the surrounding pixels is greater than/equal to, or greater than, a specified limit value.

In the sixth process step, the image value of every pixel of the temporarily-refined first digital image data is weighted (with reference to the location) with the corresponding weighting value of the corresponding pixel of the second digital image data (in particular multiplied by the quotient from the fifth process step) and provided with refined first image data in this way. In case of these refined image data, it no longer involves merely temporarily-refined image data, rather it involves image data which include information about the finer resolution second digital image data. This sixth process step can be designated as data fusion.

As already mentioned, the entire process can be paralleled very well, i.e. very many process steps and partial calculations can be implemented parallel in time with other process steps. In particular, the resources of parallel processors and multi-processor systems available nowadays can be utilized very effectively. Not only the fourth process step can be implemented parallel in time with the fifth process step in this case. As an alternative, or in addition, calculations can also be implemented in parallel within the fourth and fifth process steps. The parallelization within the fourth process step depends for example on the method of interpolation. If e.g. interpolation is implemented only linearly between several nearest-adjacent existing pixels, this interpolation can be implemented separately for all intermediate spaces between existing pixels and thus paralleled. In case of the fifth process step, the calculation of every average value of the pixels can be implemented in a local environment in parallel. Also the multiplication of the respective average value by the corresponding pixel, which is generally located in the middle of the local environment, can be implemented in parallel with the corresponding multiplications for other pixels.

However, the process cannot be paralleled in a simple way, e.g. for a so-called SIMD (Single Instruction Multi Data) architecture structured as executable, but is very simple in total concerning the outlay for the calculation of the refinement. Nevertheless, the important information made available in the second image data is used for the refinement of the first image data.

The process can therefore be applied in simple way in special hardware, which is designed especially for the refinement operations. For example, in case of such special hardware, it can involve an FPGA (Field Programmable Gate Array). Furthermore, the refinement is based on the utilization of the high-resolution geometric information existing in the fine-resolution second image data as a model. In particular, no additional quality control is required because of the process-inherent retention of the measurement signal levels.

On principle, with the process, any relationships between the local resolutions of the first image data, on the one hand, and the second image data, on the other hand, can be dealt with. In particular, the size of the local environment, in which in the fifth process step of the respective weighting value (e.g. average value) is formed, can also depend on the relationship of the local resolutions of the first and the second digital image data. The local environment can be selected larger in this case, the larger the ratio of the local resolutions of the first and the second image data. In particular, the edge length of the environment variables for the mean-value generation is greater than or equal to the resolution ratio, multiplied by the edge length of a pixel of the image data of coarser resolution. This applies for integral and analog, as well as for non-integral, resolution ratios. As an alternative, or in addition, the local environment can depend on the gradient of the image values for the formation of the weighting value.

Integral, in particular even multiples of the local resolution of the first and the second image data, are preferred, even if other non-integral ratios can occur. It is preferred in particular that the weighting value is computed for pixels which are not located on the edge of the image or of the local section, in which refining takes place, in an environment of the respective pixel, which has a number of pixels in each case in line and column direction which is equal to the integral multiple of the local resolution, if the resolution ratio is an uneven whole number, or is equal to the integral multiple of the local resolution plus 1, if the resolution ratio is an even whole number. If the ratio of the local resolution of the first and the second image data is for example 2:1, the line and column length of the local environment has a value 3. In the case of the resolution ratio being 3:1, the line and column length for the calculation of the weighting value of the predefined local area is preferably 4.

The weighting values, in particular the quotients obtained through formation of the ratio between the image value of the pixel and the average value in its environment, are preferably stored, and not only with the objective to employ the weighting values for the formation of the not only temporarily refined first image data. Rather the weighting values can be used for additional data processing steps. The reason for this is that, as a result of the type of the calculation of the weighting values, contrasts at edges, corners and linear structures of the image object recorded by the image data, are especially well highlighted. Such a further processing step can be the verification e.g. as to whether certain expected structures are located in the image, for example for the identification of the image objects in classes such as "forest", "water", "fields". The calculation of the weighting values can also be implemented before beginning the actual process of the refinement of the local resolution of the first image data, in order to achieve a co-registration of the first and the second image data and/or to improve it. As already mentioned, so-called characteristic (prominent) structures or so-called control points can be employed for the co-registration. If the weighting values have already been determined before the beginning of the actual refinement process, they do not have to be implemented again during implementation of the process steps for the refinement. The sixth process step for the formation of the first image data, which is not only temporarily non-refined, then only has as content the application of the weighting values to the respective image value of the pixel (for example multiplication of the quotients with the respective image value of the pixel).

In the case of colored image data, if therefore every pixel indicates not only a gray shade, but a majority of color values (e.g. in the RGB range) or a unique color value, e.g. as a bit sequence, the color impression acting on the observer is retained with very great probability through the refinement, in particular when the first and second image data were generated synchronously and/or with an identical image generation process.

Furthermore, a data compression can be achieved by a reversal of the process, i.e. a reduction of the data quantity. This takes effect favorably e.g. with the transfer of remote sensing data, say from a satellite to the ground station.

Furthermore, the data-processing device, which is used for the refinement of the local resolution of the first image data, can also be additionally employed for other data processing, e.g. for the calibration of the remote sensing data. The calibrated values are generally a linear function of the gray shade. The calculation of the spectral radiant flux density spSFD from the gray shades (dc—digital counts) of the image data which is optical in most cases, follows a linear function in particular:

$$spSFD=\text{gain}(Bd)*dc+\text{offset}(Bd)$$

The variables gain(Bd) and offset(Bd) are generally device-specific constants dependent on the spectral band, and are typically already defined before the start. The variable gain (Bd) corresponds to an amplification factor for the measured signal. Its value can be changed optionally remote-controlled. There are also sensors for which no offset-value is indicated, i.e. the gray shade "0" corresponds to the case where no radiation is incident on the sensor. With the described data-processing device, it is also possible to multiply image data by a constant factor and to add a constant value. In this way, the image data can be calibrated.

By a local section of digital image data which should be refined is meant a part of the entire local registration range of the respective measuring channel. The local section in this case is related to the location of a measurement sensor in particular. Subject to the prerequisite that all radiation incident on the measurement sensor and recorded comes in almost parallel (therefore no transverse radiation must be considered), the local section is allocated unambiguously to a section of the total recorded solid angle range of the measurement sensor. However, cases are also covered by the invention where transverse radiation can occur and corresponding corrections can be carried out as appropriate.

In general, the spectral ranges of the first (in particular multi-spectral) channels do not cover the entire spectral range of the second (in particular panchromatic) channel. From the first channels, measured values are therefore not existing for all partial spectral ranges of the second channel. In addition, there can be overlapping of the spectral ranges of the first channels. Furthermore, the spectral ranges of the first and second channels do not have to overlap each other. The process proposed here makes it possible, in a simple manner, to refine every first channel independently of the other channels. In this case, the same quotients (also designated as weightings) of the corresponding pixels of the second channel can be employed for every first channel. The weightings must therefore be computed only once for every pixel of the second channel and for every time-point of the image data.

The invention also includes a device for the processing of remote sensing data, wherein the device is designed to process first digital image data of at least one first measuring channel obtained by remote sensing with the use of second digital image data which are or were obtained by remote sensing from a registration range in common with the first image data and which, in comparison with the first image data, are local finer-resolution image data of at least a second measuring channel, and wherein the device indicates the following:

A processing device which is designed to refine the local resolution of the first digital image data, at least for a section of the common registration range temporarily, with the use of image values of the first digital image data, however, not the second digital image data, in such a way that the local resolution of the temporarily refined first image data corresponds to the local resolution of the second digital image data and that a pixel of the temporarily refined first digital image data corresponds to every pixel of the second digital image data A weighting-value formation device, which is designed to determine for a plurality of pixels of the second digital image data in the section of the common registration range, in particular for every pixel of the second digital image data in the section, a weighting value for the pixel in each case which corresponds to a weighting of an image value of the pixel in the ratio of the image value of the pixel to image values of surrounding pixels in a local environment of the pixel, wherein the weighting value-formation device, depending on how large the difference of the image value of the pixel to the image values the surrounding pixels and/or to the image value, or values, of a part of the surrounding pixels is, implements, before or during the determination of the weighting value, a smoothing of the local plot of the image values in the area of the pixel and its environment such that the weighting value in case of larger values of the difference is based on an additional smoothing of image values in the area of the pixel and its environment, and in case of smaller values the difference not, or such that the weighting value in case of large values of the difference is based on a stronger smoothing of image values in the area of the pixel and its environment than in case of smaller values of the difference, A weighting device which is designed to weight every pixel of the temporarily refined first digital image data which corresponds to a pixel of the plurality of pixels of the second digital image data with the weighting value of the corresponding pixel of the second digital image data, and, in this way, with the use of information about the finer resolution second digital image data, to form refined first image data.

Advantages, possible further formations and variants of the device correspond to the already designated advantages, possible further formations and to variants of the process.

In particular the device for the processing of remote sensing data can indicate one of the following characteristics, or an arbitrary combination of one of the following characteristics:

An interpolation device which is designed to refine the local resolution of the first digital image data, at least in one local section, through interpolation between pixels of the first digital image data, in such a way that it corresponds to the local resolution of the second digital image data, so that one pixel of the first digital image data corresponds to every pixel of the second digital image data, A quotient-formation device which is designed to calculate an average value of the pixels in a local environment of the pixel for every pixel of the second digital image data, and to form the quotient of the pixel and the average value A multiplication device which is designed to multiply every pixel of the first digital image data with the corresponding quotients (with reference to the location), and to provide first image data refined in this way, which include information about the finer resolution second digital image data.

In this case the quotient-formation device indicates the weighting-value formation device and is a structuring of the weighting-value formation device. The quotient-formation device has the feature, described at other locations of this description, of forming the quotient and the weighting value dependent on the difference of the image value of the pixel to the image values of the surrounding pixels and/or to the image value, or values, of a part of the surrounding pixels.

The device can be designed so that the interpolation device and the quotient-formation device are operated simultaneously with the first and second digital image data corresponding to each other, i.e. the interpolation device interpolates the first image data, while the quotient-formation device computes the quotients for the second image data.

In addition, the device can indicate a stipulation device, which is designed to stipulate the size of the local environment, in which the quotient-formation device determines the average value of the pixels of the second digital image data, where the stipulation device is additionally designed to select the environment all the larger, the larger the ratio of the local resolutions of the first and second digital image data. In addition, the stipulation device can stipulate how large the environment should be which is used for the mean-value generation and/or how the average value is determined (e.g. sliding or in raster steps whose size is determined by the resolution ratio).

The weighting value-formation device can also be designed to determine the weighting value on the basis of an additional smoothing of image values in the area of the pixel and its environment, exactly if the difference of the image value of the pixel of the second image data to the image values of the surrounding pixels and/or to the image value, or values, of a part of the surrounding pixels is greater than/equal to, or greater than, a specified limit value.

Furthermore, the invention includes a computer program for the processing of remote sensing data. The computer program is designed to implement the method in one of the described implementation forms or variants. The program can be stored on a computer-readable data storage medium and/or loaded into a main memory of a computer or computer system for execution.

Also associated with the scope of the invention is a data storage medium or a computer system, on which a data structure is stored, which after loading into a working memory and/or main memory of a computer or computer network, executes the program.

The invention-related process can be implemented through utilization of hardware and/or software.

BRIEF DESCRIPTION OF THE DRAWINGS

Design examples of the invention are now described with reference to the enclosed drawing. Reference is made in this case to panchromatic and multi-spectral data. However, this example can also be generalized to the general case of the first, coarse-resolution image data and the second, fine-resolution image data. The individual figures of the drawing indicate the following:

FIG. 10 A part-matrix of the preliminary, multi-spectral image data refined by implementation of the fourth process step, i.e. refined, multi-spectral data obtained through an interpolation of the image data from FIG. 8

FIG. 11 An image data matrix of the refined, multi-spectral image data of FIG. 9, where the lines and columns in FIG. 11 correspond to the lines and columns of the image data of the panchromatic channel in accordance with FIG. 7

DESCRIPTION OF THE INVENTION

Figure 1:
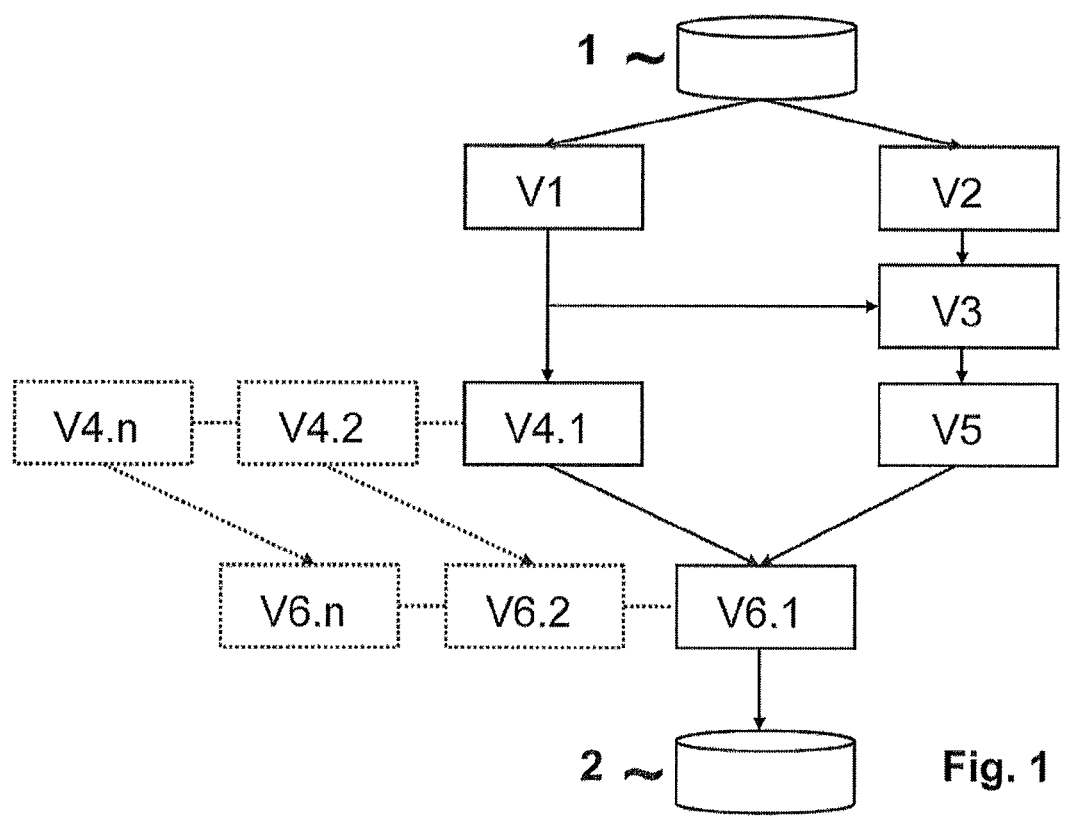
FIG. 1 A simple flow diagram for the explanation of the process steps, in accordance with a preferred implementation form FIG. 2 Schematic representation of a local partial image area, for which there exist both panchromatic and multi-spectral image data FIG. 3 A representation of four pixels M1 to M4, where the generation of an additional, interpolated pixel P is identifiable by means of a bilinear interpolation FIG. 4 An arrangement with a planet and a satellite, which indicates two multi-spectral and one panchromatic sensor, where e.g. a refinement of the local resolution of the multi-spectral image data is implemented in a ground station on the planet, the refined image data are evaluated and a result is made available for evaluation FIG. 5 A histogram of a multi-spectral digital image data record before the refinement of the local resolution FIG. 6 A histogram of the multi-spectral image data after the refinement of the local resolution FIG. 7 A part of a gray-shade matrix of real panchromatic remote sensing image data FIG. 8 The corresponding matrix of the quotients resulting from the fifth process step FIG. 9 A corresponding part-matrix of the multi-spectral image data, which corresponds to the panchromatic image data for which image values are indicated in FIG. 7

FIG. 1 indicates a data record 1, which indicates both panchromatic and multi-spectral image data. In a first process step V1, the multi-spectral image data are processed. In particular, prominent object limits are identified for an improvement of the co-registration of the multi-spectral image data with the panchromatic image data. Further possibilities for the operations implemented in the process step have already been designated.

In a second process step V2, the panchromatic image data are processed. In particular, prominent object limits are identified for an improvement of the co-registration of the panchromatic image data with the multi-spectral image data. Further possibilities for the operations implemented in the process step have already been designated.

In a third process step V3, the co-registration of the multi-spectral and the panchromatic image data is improved in particular by means of the identified prominent object limits. As an alternative, or in addition, it is determined in the third process step V3 whether the pixels are so-called surface pixels (block pixels) in environments with almost constant image values or contour pixels (edge pixels) in environments with large gradient values of the image values. The pixels are marked correspondingly.

The multi-spectral image data are refined in a fourth process step V4, by interpolation of existing pixels temporarily in such a way that the multi-spectral pixels in coarse resolution are replaced by the new pixels generated by the interpolation, and thus temporarily-refined multi-spectral image data are generated whose local resolution is identical with that of the panchromatic image data.

This process step, as suggested in FIG. 1 through blocks represented with dotted lines, can be implemented in parallel for several spectrum channels of the low-resolution image. Should it happen in the first process step V1 that the individual spectrum channels are badly co-registered with respect to each other in the spatially low-resolution image, then the offsets with respect to each other should be considered in this process step with a re-sampling.

In a fifth process step V5, implemented in parallel with the step V4, weighting factors are generated by mean-value generation, in each case in an environment of the pixels of the panchromatic image data, and through quotient formation of the image value of the respective pixel with the average value in the environment. Dependent on whether the respective pixel of the panchromatic image data is a surface pixel or a contour pixel, the environment is selected with different size for the formation of the average value of the image values. In particular, in the case of a block pixel, the environment is selected with a large value so that it is exactly equal to or approximately equal to the surface of the allocated pixel in the initial, first-image data not yet temporarily refined. Against this, in the case of a contour pixel, the environment is selected of such a size that it is larger than the surface of the allocated pixel in the initial, first-image data not yet temporarily refined. In the fifth process step V5, the offsets determined in the third process step V3 can be corrected, in particular concerning the co-registration of the first and second image data.

The fifth process step V5, generally formulated, not only with reference to the concrete design example of FIG. 1, must be implemented in its implementation section following the third and before the actual data fusion of the stipulation of the weighting values, with which the image points of the spatially low-resolution image are weighted, according to which for example was made identical to the spatially high-resolution image through re-sampling, including a co-registration. The stipulation of the weighting values, with regard to an evaluation of these images, is almost completely provided with their radiometric properties, i.e. the plot of the two-dimensional image function of the spatially low-resolution image is not changed by its re-sampling. Also possible image improvements are subject to this condition in the process steps V1 and V2.

In the sixth process step V6, which follows on the fourth and fifth process implemented step in parallel with that, a data fusion occurs where the weighting values, in particular the quotients, are multiplied by the corresponding image values of the pixels of the multi-spectral image data. As a result of the sixth process step V6, refined-resolution, multi-spectral image data 2 are obtained.

Figure 2:
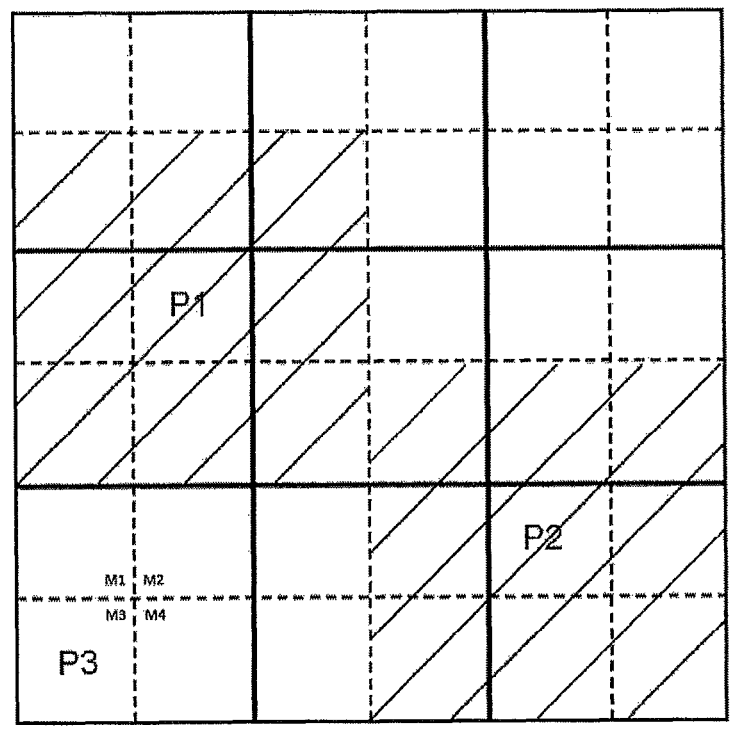

With reference to FIG. 2, examples of process steps are now explained during the refinement of the local resolution of the multi-spectral image data. The example corresponds to the case of a contour pixel.

FIG. 2 indicates schematically a total of nine pixels of multi-spectral image data, which are represented by quadratic areas which are bounded by unbroken lines. In addition, smaller squares, which are separated by dashed lines, are identifiable in FIG. 2. These squares correspond to pixels of finer resolution panchromatic image data. Four pixels of the panchromatic image data are located in every pixel of the multi-spectral image data, i.e. the resolution ratio between the multi-spectral image data and the panchromatic image data is 2:1. In the example of the pixel P3 of the multi-spectral image data, which is represented in FIG. 2 below to the left, the four panchromatic image pixels are described by M1, M2, M3, M4.

In the fourth process step for the refinement of the local resolution of the multi-spectral image data, an interpolation is implemented so that there are also multi-spectral image data located in the finer local resolution of the panchromatic image data. An example of the interpolation will be dealt with in more detail.

The mean-value generation in the panchromatic image data takes place in each case for two examples of individual pixels P1, P2 of the panchromatic image data in a 3×3 environment, i.e. in an environment with 3 pixels around the central pixel both in column direction as well as a line direction. In practice, the average value was formed in particular for each of the pixels in the represented local area. Two such 3×3 environments in FIG. 2 are shaded through diagonal lines FIG. 2. The central pixel in the further represented environment to the left above is designated with P1, the central pixel in the environment to the right below is represented with P2. For the mean-value generation, the sum of the nine pixels is formed in the environment and divided by the number of pixels. Generally formulated, the image values of the pixels in the environment are summed for the formation of the average value and divided by the number of pixels.

Following this the quotient is formed for the central pixel, where its image value is divided by the average value. If it involves an edge pixel around the central pixel, the pixel is not centrally located in the environment which is used for the mean-value generation.

For the refinement of the image data, the quotient formation is a significant process step, with which the geometrical information of the second fine-resolution image data can be transferred to the first coarse-resolution image data. With exact co-registration of the first and the second image data, the average value and quotient formation can be implemented through an allocation of the pixels of the coarse (first) and the fine (second) image data. In case of a resolution ratio of 2:1, (as represented in FIG. 2) e.g. the average value is determined from 9 pixels of the fine-resolution image data (SFIM method), if it involves the central pixel of a contour pixel, and the average value is determined from 4 pixels of the fine-resolution image data (PBIM method), if it involves e.g. a surface pixel as in case of P3. Alternatively, a larger environment can also be selected for the contour pixels for the mean-value generation.

Since in practice an exact (completely precise) co-registration cannot generally be assumed, the average value, which is referred to for the calculation of the coefficients in the case of contour pixels, cannot be calculated optionally through a fixed allocation of the points of the second image data to those of the first image data, rather by means of a sliding window in the second image data. An uncertainty is caused by this in the refined image data. However, this process method leads to better results in case of non-exact co-registration as a fixed allocation of the pixels.

Figure 3:
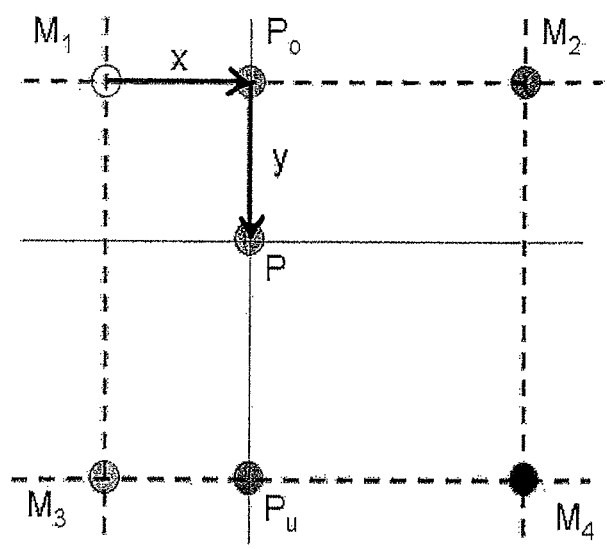

FIG. 3 indicates an example of a bilinear interpolation for the objective of the formation of the temporarily refined multi-spectral image data. At the corners of the square represented in FIG. 3 with dashed lines (the dashed lines are the lines of the columns and rows of the multi-spectral pixels) the existing multi-spectral pixels $M_1$, $M_2$, $M_3$ and $M_4$ are located. The line direction is represented with an arrow of length x pointing to the right. The column direction is represented with an arrow of length y pointing downwards. In case of the bilinear interpolation for the generation of an interpolated multi-spectral image point P, first computational image points $P_o$ and $P_u$ are generated, which are located on the lines-connecting lines between the upper existing image points $M_1$, $M_2$ and the lower existing image points $M_3$, $M_4$. The following calculation formulae are employed here:

$$P_o=(1-x)*M_1+x*M_2$$

$$P_u=(1-x)*M_3+x*M_4$$

The values X and the value employed in the following formula value y in this case are between 0 and 1, i.e. the interpolated value can only be between the four existing multi-spectral pixels which are considered in the interpolation. From the points $P_o$ and $P_u$, the interpolated point P is now determined according to the following equation:

$$P=(1-y)*P_o+y*P_u$$

Basically it is also possible to extrapolate values outside of the surface which is formed by the points M1, M2, M3 and M4. This can be used to advantage at the edges of the image, if no adjacent points are present, in order to interpolate within a surface formed from four points.

Figure 4:
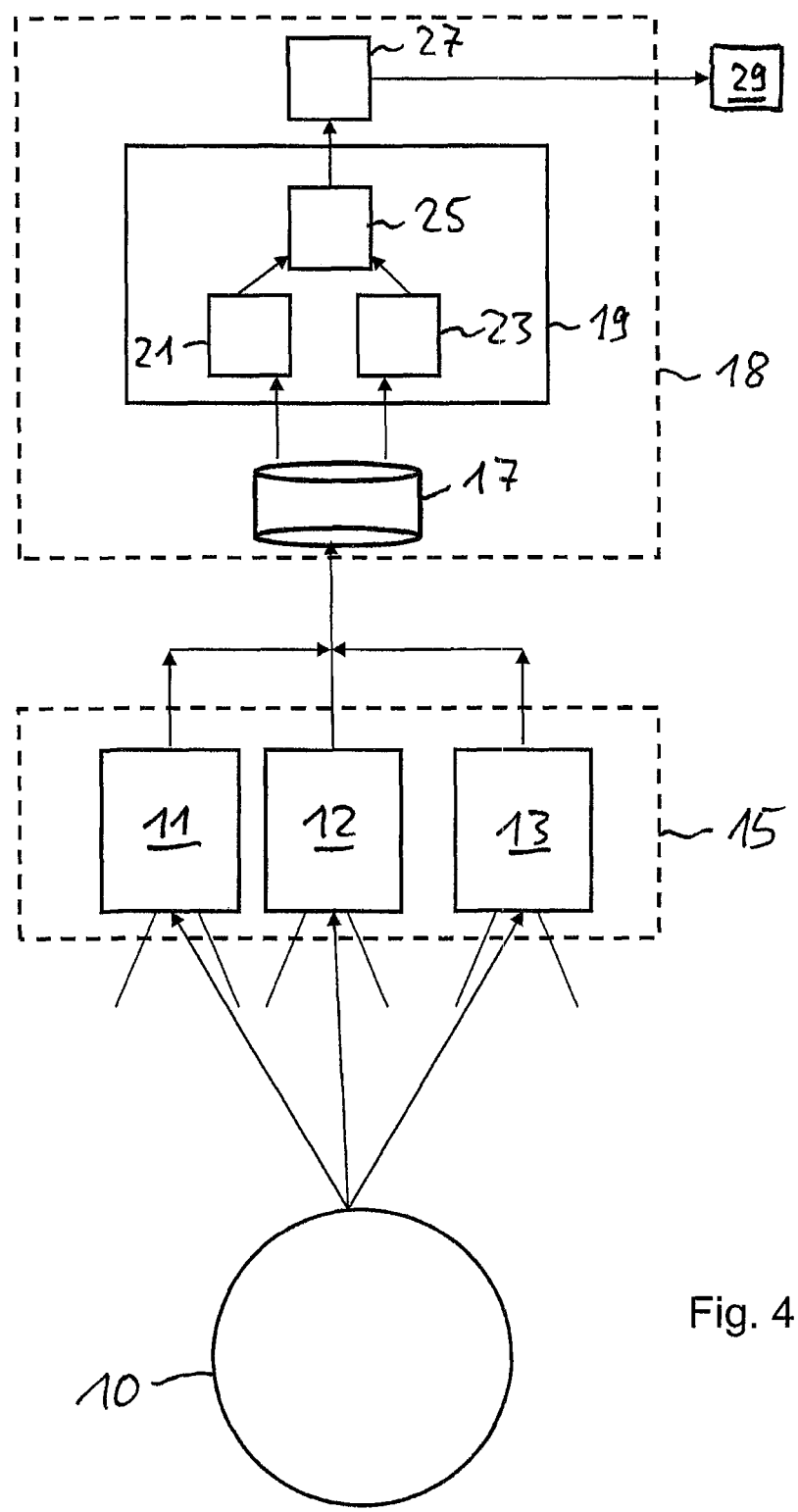

FIG. 4 indicates a planet 10, e.g. the earth. From an observation region on the surface of the planet 10, electromagnetic radiation is emitted and/or reflected, which is received by three sensors 11, 12, 13 of a satellite 15, and is converted into two-dimensional digital image data in each case. In particular, the recording of the images of the observation region can be implemented continuously.

Sensor 13 is a panchromatic sensor which registers a larger spectral range of electromagnetic radiation than the two multi-spectral sensors 11, 12. However, the local resolution of the panchromatic image data is finer than that of the multi-spectral image data. The images recorded by sensors 11, 12, 13 are transferred in the form of two-dimensional digital image data to a data memory 17 of an evaluation device 18.

The panchromatic and multi-spectral digital image data are processed by a data-processing device 19, e.g. an FPGA of the evaluation device 18, in order to refine the local resolution of the two different multi-spectral image data. This is implemented continuously in real time. For example, the refinement begins of an image recorded at a certain time by a multi-spectral sensor 11, 12, as soon as the image is stored in the data memory 17 and can be read out by the data-processing device 19.

The data-processing device 19 indicates an interpolation device 21 which implements the above-described fourth process step of the interpolation between pixels of the multi-spectral digital image data. Furthermore, the data-processing device indicates a quotient-formation device 23, which implements the above-described fifth process step. The weighting values calculated by the weighting value formation unit and the temporarily refined multi-spectral image data, are supplied to a device 25, which implements the above-described sixth process step. In practice, the devices 21, 23 and 25 can be different areas of the same data-processing device or e.g. be implemented through different parts of the program of the same program. In particular, the data-processing device 19 can additionally indicate a device which is designed to improve the co-registration of the first and second image data, for example on the basis of detected prominent object limits in both image data records. In this case, the data-processing device 19 therefore also indicates a device which detects the prominent object limits. For example, this device can differentiate between so-called contour pixels and surface pixels as explained at another location in this description.

The refined resolution multi-spectral image data are available at the output of the device 25 and are transmitted to a device 27, which carries out a data evaluation on the basis of the refined data, and makes available a result of the evaluation and transmits it e.g. to a receiver device 29. The evaluation device 18 is e.g. part of a ground station on the surface of planet 10. The device 27 can also be located at another location and e.g. can be part of the receiver device 29.

Figure 5:
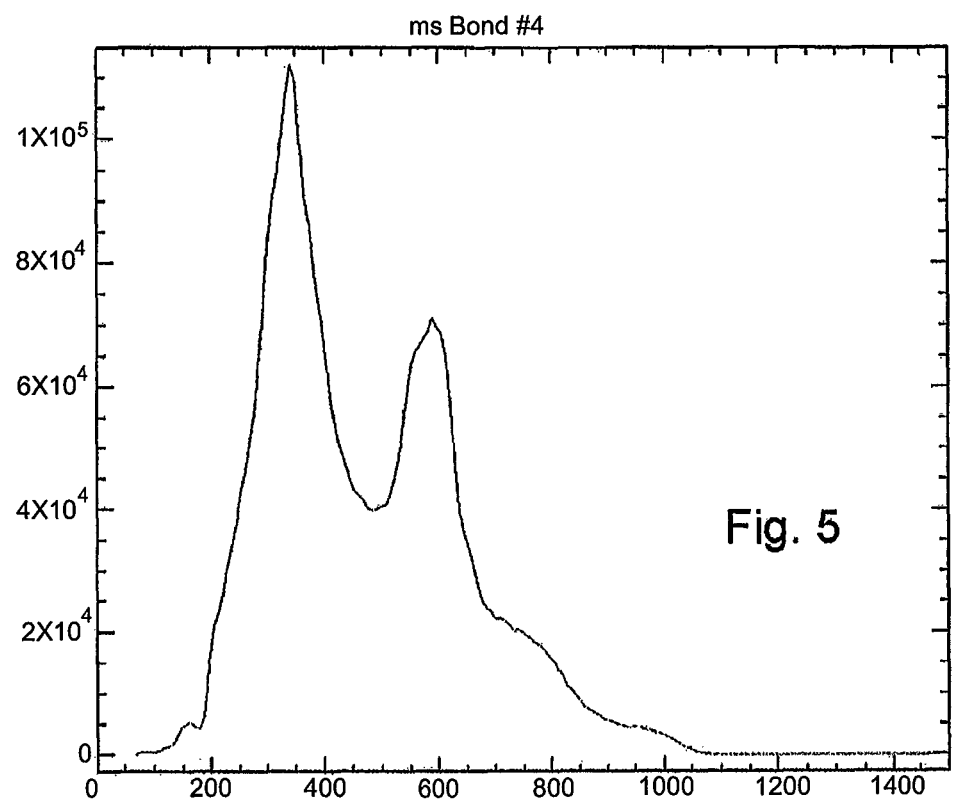
Figure 6:
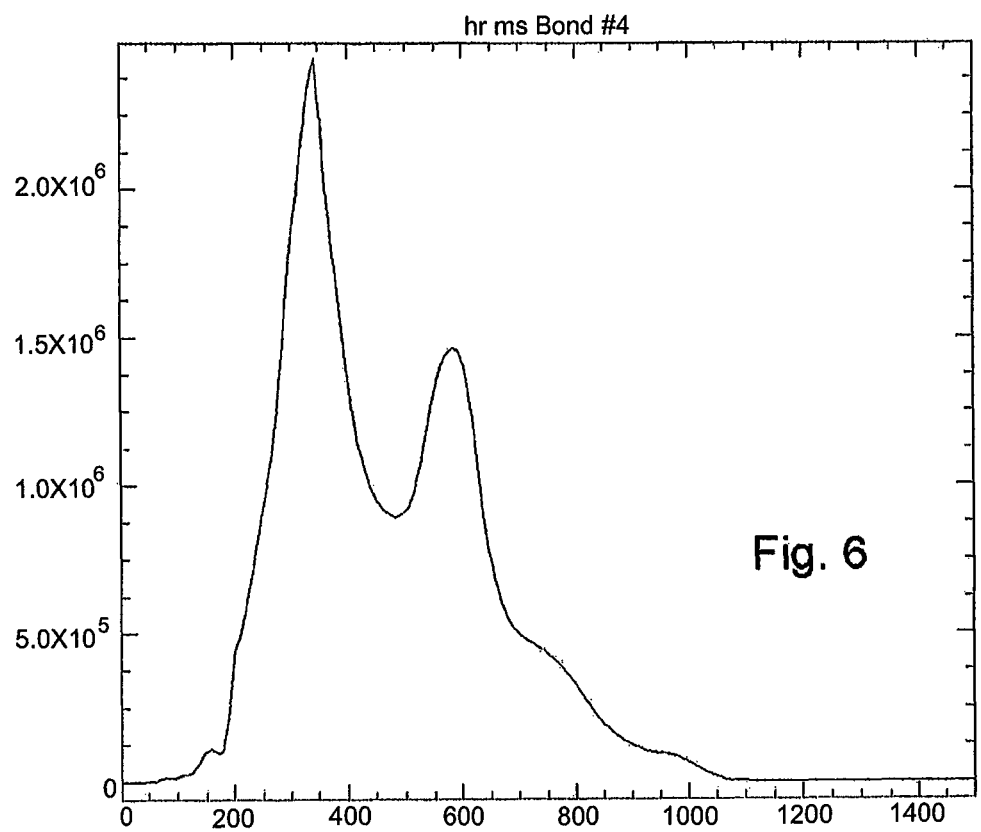

FIG. 5 and FIG. 6 indicate histograms of a multi-spectral image data record, i.e. of an image recorded at a certain point in time, before and after the refinement of the local resolution, in accordance with the process of this invention. Although the process does not include any process step for quality control, no significant changes of the color impression arise, and the balance of the radiation energy incident on a small section of the sensor is changed insignificantly, if at all.

No quality control is necessary, because the measurement signals at the locations at which they could be measured are almost retained. The fact that no quality control is necessary is proved through the histograms in accordance with FIG. 5 and FIG. 6. On the horizontal axis of the histograms, the gray shades of the band are placed in ascending sequence. The vertical axis indicates the frequency (here the absolute), with which the individual gray shades are represented in the image matrix considered.

It can be identified that both in FIG. 5 and in FIG. 6 the absolute frequency increases steeply to a maximum between the gray shades 200 to 350. Also the plot dropping then to a local minimum with the gray shade 500 is almost identical. The following plot of the histogram function with higher gray shades is slightly different. In total, however, the plot of the histogram functions is very similar. The histogram of the refined image looks slightly different because the interpolation is not calculated for integral address values. Non-integral gray shades arise as a result of the interpolation and the mean-value generation for contour pixels determines a smoothing (i.e. a low-pass filtering) of the second, fine-resolution image data. The location of the maximums is maintained however. This is an indication of conservation of the color impression. Also the area integral of the histogram function is such an indication. As the example in FIGS. 5 and 6 indicates, area integral is also retained during refinement. This retention of the area can be equated with a conservation of energy, i.e. the refined image data correspond to a recording of image data with similar incident radiation energy as the actually recorded image data. In general, not only with reference to the design example explained by means of FIG. 5 and FIG. 6, the following criteria are maintained in the implementation of the invention-related process for the refinement of the local resolution:

1. The dependence of the image values (for example the intensity of radiation or the reflection factor) as a function of the location is retained during provisional refinement of the first image data and preferably also after the final refinement to a large extent such that, in a local environment, in particular in the local environment of every individual pixel of the image data not yet refined, the histogram function remains approximately unchanged. As indicated, slight differences can arise from the final refinement in the histogram function.
2. It follows from this that also the spatial integral of the image values over the local environment remains approximately unchanged.
3. Furthermore, it follows from this that also the differential of the local dependence on the image values in the local environment remains approximately as before.

FIG. 7 represents a gray-shade matrix, which is taken from a real panchromatic image of a satellite sensor. FIG. 7 indicates the gray shades of the lines 4.224 to 4.233 and the columns 6.636 to 6.643. In FIG. 7 the numerical values of the columns 6.639-6.641 and the lines 4229-4231 are framed. The central image point of this 3×3 matrix, where it involves a contour pixel, is located in column 6.640 and line 4230, and has the value 45. After the mean-value generation, a quotient with the amount 0.7143 (FIG. 8) results at this point.

FIG. 8 indicates the corresponding result matrix after implementation of the above explained fifth process step, where, first of all, in an environment (here of 3×3 pixels) for every central pixel, the average value and then the quotient of the image value (here gray shade) and the average value are formed. The environment of 3×3 image points was selected since the resolution ratio of the multi-spectral and panchromatic image data is 2:1, and since with almost all pixels it involves contour pixels. Only a few pixels are surface pixels (for example at the position in column 6638 and line 4228 and also at the position in column 6636 and line 4228). For these surface pixels, an environment of 2×2 image points was selected in each case for the mean-value generation.

It can be identified from FIG. 8 that the quotients are all located in the range from 0.72 to 1.15. It should be mentioned that, with the values in the columns located farthest to the left and to the right in FIG. 7, and with the lines located farthest above and below in FIG. 7, it does not involve edge pixels, since the table represents only a section of the total image matrix.

Since the average value is computed for every contour pixel in its own environment which is greater than the surface of the corresponding pixel of the first low-resolution image data, not yet temporarily refined, this can be designated as a smoothing of image values. The procedure of smoothing reacts insensitively to sharp contrasts, e.g. bright-dark transitions with sharp edges. In particular no artificial gray-shade differences are generated by the refinement in the case of panchromatic and multi-spectral image data which are not co-registered exactly, which mix up non-existing object limits.

FIG. 9 indicates an image data matrix of the multi-spectral image data, which correspond to the panchromatic image data for which a section is represented in FIG. 7, namely the lines 4.224 to 4.233 and the columns 6.636 to 6.643. Since the resolution ratio of the multi-spectral image data and the panchromatic image data is 2:1, the location of the lines and columns in FIG. 9 corresponds to the location of the lines and columns in FIG. 7 if it is multiplied by the factor 2. The image matrix, whose section is represented in FIG. 11, arises from the result of the refinement (implementation of the above described process steps V4 to V6). In FIG. 11, the lines 4.224 to 4.233 and the columns 6.636 to 6.643 are again accordingly identified. The rectangular line in FIG. 9 in this case frames the local area in the multi-spectral image data not yet refined, which came about through the refinement relating to the area represented in FIG. 11. As a matter of course, the image values, which are identifiable at the edge of the section represented in FIG. 11, also still contribute further to the initial image values of the multi-spectral data. These further image values are referred to with the interpolation (in the existing example a bilinear interpolation as explained in FIG. 3) in process step 1.

In FIG. 9 the point M is additionally marked in column 3320 and line 2115 is marked with the value 33. This corresponds with the marked central value in the FIGS. 7 and 8, however, is an element of the coarse-resolution image data. For the bilinear interpolation for the calculation of the intermediate values, the adjacent items to the right and below with the values 29, 31 and 31 are used. This is suggested through dashed lines, similar to the representation in FIG. 3.

FIG. 10 represents the status of the temporarily-refined, multi-spectral image data which is obtained after implementation of the first process step. The marked elements in the columns 6.640-6.641 and the lines 4.230-4231 in this case replace the image point M {3320; 2115} after the interpolation with the image value 33 in FIG. 9. These image points represent the interpolated image function at the locations {x;y}={0.25; 0.25}, {0.75; 0.25}, {0.25; 0.75} and {0.75; 0.75}, where the point M corresponds to the location {0;0}. The values of the temporarily-refined, coarse image data are determined according to the schematic displayed in FIG. 3. It can be identified that, as a result of the interpolation at non-integral locations in the image matrix, the original values from FIG. 9 do not occur. This is a reason for the slightly changed appearance of the histogram (see above).

The final result represented in FIG. 11 is thus obtained through the multiplication of the elements of the matrix in FIG. 8 with the corresponding element in each case (concerning the line position and according to column position) in FIG. 10.

Figure 12:
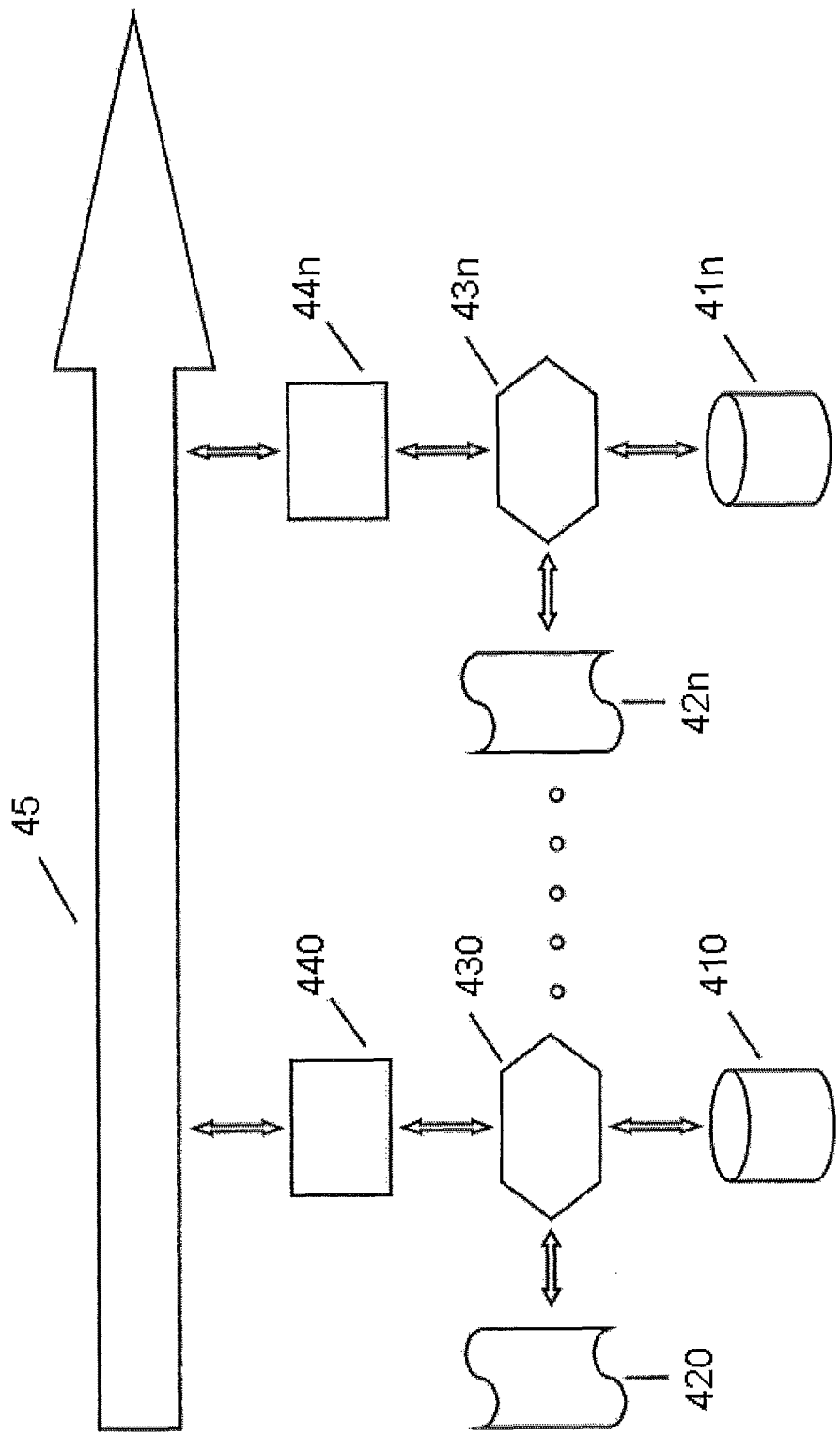
FIG. 12 A device for the refinement of the local resolution of multi-spectral remote sensing data, where N+1 processors are provided which work in parallel, i.e. simultaneously FIG. 13 Similar as in FIG. 2, a schematic representation of a local partial image area, for which both fine-resolution as well as coarse-resolution image data are available, in order to clarify an example of the formation of a weighting value in the case of exactly co-registered image data FIG. 14 Similar as in FIG. 13, a schematic representation of a local partial image area, for which both fine-resolution as well as coarse-resolution image data are available, in order to clarify an example of the formation of a weighting value in the case of items not co-registered exactly, in order to clarify a pixel of the fine-resolution image data of offset image data FIG. 15-16 Matrices of image values and corresponding matrices with allocated weighting values for the representation of the influence of an inadequate co-registration on the determination of the weighting values.

FIG. 12 indicates a device for the refining of the local resolution of multi-spectral remote sensing data images, which indicates N+1 parallel processors 430, . . . 43*n*, i.e.

parallel data-processing devices. For example, every processor can be realized by an FPGA. Every processor (hexagonal bounded surface) is linked with a program memory 420, ... 42n and with a data memory 410, ... 41n. The five points somewhat in the middle of FIG. 12 indicate that not all N+1 processors 430, ... 43n are represented, rather only the processor 430 to the left in the image and the processor 43n to the right in the image. Above every processor 430, ... 43n a data buffer 440, ... 44n is represented by a rectangular area.

The number N is an integral positive number, which is equal to the number of multi-spectral channels to be processed simultaneously or in parallel, i.e. it corresponds to the number of multi-spectral image data in different frequency ranges. With the device represented in FIG. 12, the process steps to be implemented for the refinement of the local resolution of the multi-spectral remote sensing data can be implemented, in accordance with the invention, time-related one after each other or, however, parallel with each other. In case of a time-related parallel implementation, the multi-spectral image data of the individual channels to be refined are stored in the data memories 1 to N in this design example. The processor 43 allocated in each case, accesses the image data and implements the process step 1, with which the data are refined temporarily by interpolation. In order to control the data processing of processor 43, a program is stored in the allocated program memory 42 in each case. As a result of the provisional refinement, the processor 431, ... 43n outputs the temporarily-refined data to the allocated data buffer 441, ... 44n. However, the processor 430 is operated correspondingly concerning the panchromatic image data. It accesses the data memory 410, in which the panchromatic image data are filed. In accordance with the program filed in the program memory 420, the processor 430 calculates from this the quotients in accordance with the above described process step V5. As a result, the processor 430 outputs the matrix of the calculated quotients to the data buffer 440, where this matrix is stored. The distribution of the processing of the channels and thus the image data to the N+1 processing sections indicated in FIG. Z2, can be implemented differently than described above.

As is suggested through the large arrow 45 above in FIG. 12 pointing from left to right, the respective matrix of the refined multi-spectral remote sensing data is calculated from the data stored in the data buffers 441 to 44n through further processing devices not represented in more detail. The same quotient matrix from data buffer 440 is employed in this case, which is multiplied by the temporarily-refined matrix of the multi-spectral image data, where only the array elements corresponding to each other with regard to the line and column position are multiplied by each other. In the case described, the data flow is a flow of the refined multi-spectral remote sensing data which should be transmitted to a receiver. However, FIG. 12 can also be understood as a representation of the processing of the data flow incoming from the respective sensors. In this case, the respective multi-spectral remote sensing data not yet refined are filed in the data buffers 441 to 44 n, so that the processors 431 to 43n can access them. In data buffer 440 the panchromatic data are filed. The function of the processors 430 to 43n is described the same as above, however, where they access the data buffers 440 to 44n and not the data memories 410 to 41n represented below in FIG. 12. The data calculated by the processors 43 in process steps 1 and 2 are initially filed in the allocated data memory 41 below in FIG. 12. Likewise, through the processors 431 to 43n, the quotients stored in the memory 410 by the processor 430 can be linked through multiplication with the temporarily-refined, multi-spectral data stored in the data memories 411 to 41n, and via the data buffer 441 to 44n again inserted into the data flow. In particular, also the optional process steps can be implemented with the processor N+1, e.g. the improvement of the co-registration, the edge detection, the differentiation of contour and surface pixels and/or the smoothing.

With the device represented in FIG. 12, other data processing methods for the processing from panchromatic and multi-spectral remote sensing data can also be implemented very effectively, e.g. brightness and contrast changes, as well as calibration of the data. Also these operations require only one process step. In case of the representation of the device in FIG. 12, to provide for simplicity, the representation of further device component parts, such as e.g. power supply, decoders for the decoding of data, decommutators, bus systems, registers, status displays, input and output systems, which can be present in a known manner with data processing systems, is dispensed with.

The invention-related refinement of the multi-spectral image data can be employed e.g. in image-data-based crisis information and consultation systems, which use corresponding remote sensing data, in geographical information systems, in image processing systems for other objectives and also generally with the processing of satellite data.

Figure 13:
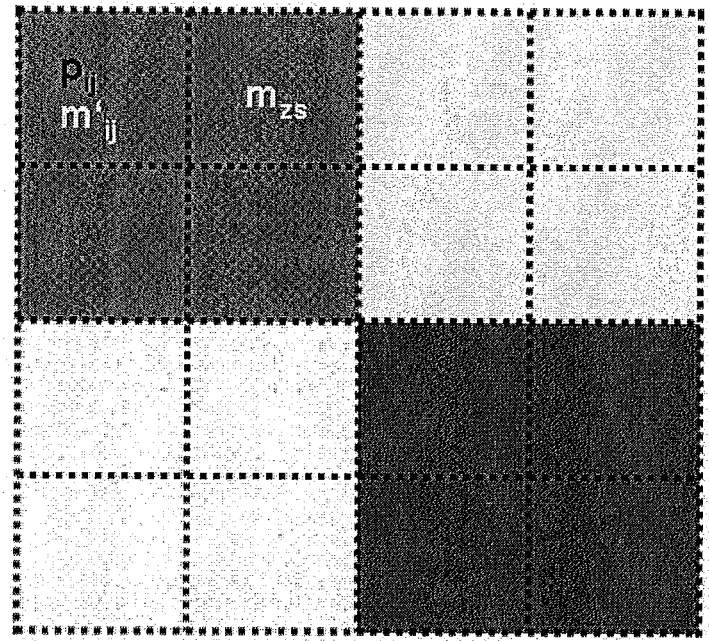
Figure 14:
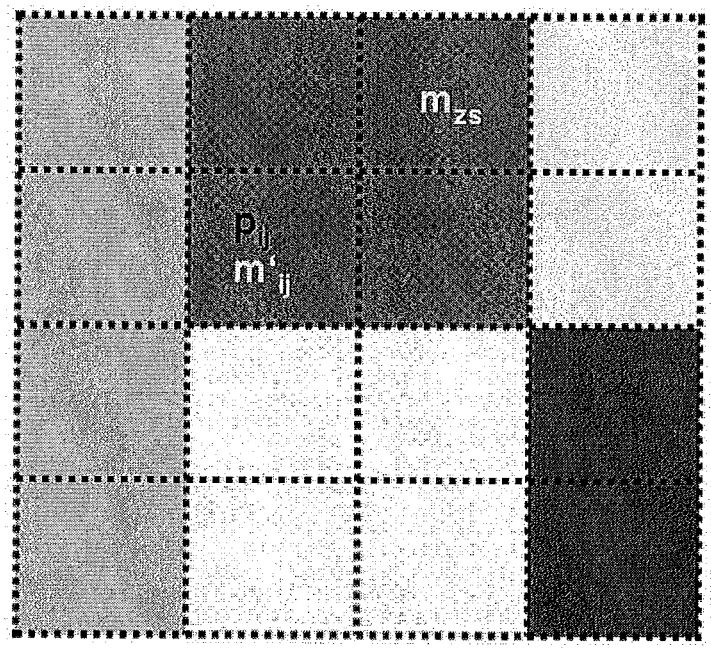

With reference to FIGS. 13 and 14, the spatially coarse-resolution image M indicates the number of S columns and Z lines, while the spatially fine-resolution image P has the number of I columns and J lines. It applies for a registration range of the same size that S is smaller than I and that Z is smaller than J. Without restriction of the generality, the quotients v1=I/S and v2=J/Z are for example equal (v=v1=v2) and integral. However, this is not a condition for the implementation of the process of refinement of the coarse-resolution image data.

A re-sampling (for example through linear interpolation) of the image M leads to a temporarily-refined image M' which, as well as the spatially fine-resolution image P, has the number of I columns and J lines and whose registration range in the ideal case is exactly congruent with that of P. The images M' and P are then co-registered.

By means of an design example, it is described by FIGS. 13 and 14 how the weighting value matrix used for the resolution improvement can be determined. Two approaches are displayed here for the calculation of the intensity modulation of the result of the image fusion. The two approaches are designated by Liu in the above-mentioned publication. With one approach and/or process, it involves the processes described by Liu "Pixel Block Intensity Modulation" (PBIM). This approach is explained using FIG. 13. With the other approach or process, it involves the process designated as "Smoothing Filter-based Intensity Modulation" (SFIM) by Liu. This approach is explained using FIG. 14.

The example of FIG. 13 indicates a registration range in which 2×2 image elements of the low-resolution image M and 4×4 image element of the high-resolution image P are located. In this case the ratio of the resolutions is v=2. In FIG. 13 the pixels of the low-resolution image are represented by the four differently shaded areas. The scored lines indicate the raster of the high-resolution image. Four pixels $p_{ij}$ of the image P and $m'_{ij}$ of the image M' correspond to a pixel $m_{zs}$ of the image M. The four pixels of the image P and the image M' in each case form a pixel block (an environment), from which the four weighting values $w_{ij}$ are determined for this block:

$$w_{ij} = \frac{p_{ij}}{\mu}$$

$$\mu = \frac{1}{n*m}\sum_{i=1}^{i=n}\sum_{j=1}^{j=m} p_{ij}$$

μ is the average value of the image values over the n*m environment in this case (that is the n×m pixels of high-resolution image data), where n and m are positive whole numbers. In the case of FIG. 13, n=m=2 applies.

In the case of FIG. 14, a fault of the co-registration is present for the high-resolution image data P and the low-resolution image data M. It involves a shift of the high-resolution image P in line direction by one pixel of the high-resolution image P.

In this case, the weighting values $w_{ij}$ according to the SFIM are determined as follows:

$$w_{ij} = \frac{p_{ij}}{\rho}$$

$$\rho = \frac{1}{n*n}\sum_{i=i-N}^{i=i+N}\sum_{j=j-N}^{j=j+N} p_{ij}$$

ρ is the average value of the image values over an n*n environment in this case, where n is a positive whole number. In the case of FIG. 14 in which n=3 applies, the environment is enlarged in comparison to the BIM method by one pixel in line direction and by one pixel in column direction (this means in this case that the nine pixels environment has the high-resolution image data).

Unlike the publication of Liu, the process proposed here assumes the following:
PBIM is not only applicable on multiple-channel and different-resolution images of a sensor system,
SFIM is also applicable on multiple-channel and different-resolution images of a sensor system,
Both methods can be used simultaneously for one and the same image data record, for the determination of the weighting value matrix.

In the following, the influence of an inadequate co-registration on the determination of the weighting values is explained by means of FIGS. 15 and 16, in the case of the application of the PBIM method. Represented to the left in the two figures is an arbitrary pixel block from the high-resolution image. The resolution ratio v has a value 4 in the example. In FIG. 15, the pixel block has an average gray shade of 94.375. The corresponding weighting value matrix obtained by PBIM is represented to the right. If this pixel block, due to insufficient co-registration, is offset by only one pixel in line direction with respect to the lower resolution image (FIG. 16), the average gray shade in only 71.875 and other weighting values therefore result of $w_{ij}$ for the weighting value matrix. The result image E, whose image elements $e_{ij}$ calculated from $e_{ij} = w_{ij} * m'_{ij}$, are incorrect and an object limit (here identifiable at the gray shade jump from 10 to 100) appears in the result image E at the incorrect location.

Therefore it is proposed, on the one hand, to check the co-registration and (if required) improve it. On the other hand, it is proposed to implement an additional smoothing for contour pixels with the objectives of the calculation of the weighting values, such as for example is the case with the SFIM method.

The extent of the effect is dependent on the size of the gray-shade differences in the pixel block, i.e. at object limits in the image it is clearly visible, while in uniform areas (almost the same or the same gray shades) on the other hand it is not. The effect can be reduced through the application of the SFIM process with the determination of the weighting value matrix, namely at object limits. In uniform image areas, both processes lead to similar weighting values. This opens the possibility to use both processes (or equivalent processes resp.) for the calculation of the weighting value matrix for the purpose of the refinement of the local resolution, and thus for the image fusion, namely the SFIM process at object limits and the PBIM process in the uniform image areas (e.g. in the area of objects with almost the same or the same image value, e.g. gray shade).

An example of this is explained in the following, as to how object limits and thus contour pixels are determined in digital images. The weighting value matrix W is used for this, if the weighting values are calculated in accordance with the SFIM process. If their elements wij have an amount approximately equal to 1.0, the corresponding image elements pij of the higher-resolution image P are located in a particular quadratic n×n pixel size environment which is almost uniform (where the whole positive number n in line direction and column direction is generally greater by 1 than the resolution ratio v). If the amounts deviate considerably from 1.0, the corresponding image elements are part of an object limit. The size of the deviation from 1.0 can be considered as a threshold value or limit value and can be preferably adjustable, which means given individually for the implementation of the process. As a result of the thus possible differentiation of the object limits of uniform areas, these can be subjected to a separate numeric processing, which must not include the application of the PBIM process or the SFIM process.

If an identified uniform surface is larger than a pixel block defined by the ratio of the spatial resolutions in the high-resolution image, a constant can be determined for this larger uniform surface for all pixels of the surface-identical weighting value. This means that the average value or the weighting value in uniform surfaces can be calculated not only in an n*m environment (see above FIG. 13), but also in a large, irregular surface that is bordered by a polygon of edge pixels.

The invention claimed is:

1. A method for the processing of remote sensing data comprising the steps of: processing first digital image data, wherein first digital image data, which are, or were, obtained by remote sensing and which are the image data of at least one first measuring channel with the use of second digital image data, which are, or were, obtained by remote sensing from a registration range in common with the first image data and which, in comparison with the first image data, are image data with a finer local resolution of at least a second measuring channel, wherein
   a) refining a local resolution of the first digital image data, at least for a section of the common registration range, without utilization of image values of the second digital image data, temporarily in such a way that a local resolution of the temporarily refined first image data corresponds to the local resolution of the second digital image data, and that one pixel of the temporarily refined first digital image data corresponds to every pixel of the second digital image data,
   b) determining a weighting value for each pixel in a plurality of pixels of the second digital image data in the section of the common registration range, which corresponds to a weighting of an image value of the pixel in a ratio of the image value of the pixel to image values of surrounding pixels in a local environment of the pixel,
   c) implementing, dependent on how large a difference of the image value of the pixel to at least one of the image values of the surrounding pixels and the image values of a part of the surrounding pixels is, before or with the determination of the weighting value, a smoothing of a local plot of the image values in an area of the pixel and its environment such that the weighting value in case of larger values of the difference is based on an additional smoothing of image values in the area of the pixel and its environment and in case of smaller values of the difference not, or such that the weighting value in case of larger values of the difference is based on a stronger smoothing of image values in the area of the pixel and its environment than with smaller values of the difference, d) weighting every pixel of the temporarily refined first digital image data which corresponds to a pixel of the plurality of pixels of the second digital image data with the weighting value of the corresponding pixel of the second digital image data and in this way refined first image data are obtained, which were obtained using information about the finer-resolution second digital image data.

2. The method according to claim 1, wherein the weighting value is determined on the basis of an additional smoothing of image values in the area of the pixel and its environment, if and only if the difference of the image value of the pixel of the second image data to the image values of the surrounding pixels and/or to the image value, or values, of a part of the surrounding pixels is greater than or equal to, or greater than, a specified limit value.

3. The method according to claim 1, wherein, in case of determination of the weighting value for every pixel of the temporarily refined first image data, an average value of the image values of the corresponding pixel of the second image data, and its surrounding pixels in the local environment of the pixel, is determined.

4. The method according to claim 3, wherein the average value of the image values is determined in a local area of the second image data, which corresponds to the local area of the corresponding pixel of the first image data not yet refined, if the difference of the image value of the pixel of the second image data to the image values of the surrounding pixels and/or to the image value, or values, of a part of the surrounding pixels is smaller than or equal to a specified limit value.

5. The method according to claim 3, wherein the average value of the image values is determined in a local area of the second image data which is greater than the local area of the first image data of the corresponding pixel not yet refined, and which includes the local area of the corresponding pixel of the first image data, if the difference of the image value of the pixel of the second image data to the image values of the surrounding pixels and/or to the image value, or values, of a part of the surrounding pixels is greater than or equal to, or greater than, a specified limit value.

6. The method according to claim 1, wherein the weighting value is determined for at least a part of the pixels in the plurality of pixels of the second digital image in the section of the common registration range through formation of a quotient of the image value of the pixel and an average value of the image value of the pixel and the image values of the surrounding pixels in the local environment of the pixel.

7. A non-transitory computer readable medium storing a computer program for the processing of remote sensing data which when executed by a processor causes the processor to implement a method in accordance with claim 1.

8. Computer system on which a data structure is stored which, after loading into a working memory and/or a main memory of a computer or computer network of the computer system, executes the program according to claim 7.

9. A device for processing remote sensing data, wherein the device is designed to process first digital image data of at least one first measuring channel obtained by remote sensing, with the use of second digital image data which are, or were, obtained by remote sensing from a registration range in common with the first image data and which, in comparison with the first image data, are image data with a finer local resolution of at least a second measuring channel, and wherein the device comprises the following:

a processing device which is designed to refine a local resolution of the first digital image data, at least for a section of the common registration range temporarily, with the use of image values of the first digital image data, however, not the second digital image data, in such a way that a local resolution of the temporarily refined first image data corresponds to the local resolution of the second digital image data and that a pixel of the temporarily refined first digital image data corresponds to every pixel of the second digital image data, a weighting value-formation device which is designed to determine, for a plurality of pixels of the second digital image data in the section of the common registration range, in each case a weighting value for the pixel which corresponds to a weighting of an image value of the pixel in a ratio of the image value of the pixel to image values of surrounding pixels in a local environment of the pixel, wherein the weighting value-formation device, dependent on how large a difference of the image value of the pixel to the image values of the surrounding pixels and/or to the image value, or values, of a part of the surrounding pixels is, implements, before or during the determination of the weighting value, a smoothing of a local plot of the image values in an area of the pixel and its environment such that the weighting value in case of larger values of the difference is based on an additional smoothing of image values in the area of the pixel and its environment, and in case of smaller values of the difference not, or such that the weighting value in case of larger values of the difference is based on a stronger smoothing of image values in the area of the pixel and its environment than in case of smaller values of the difference, a weighting device which is designed to weight every pixel of the temporarily refined first digital image data which corresponds to a pixel of the plurality of pixels of the second digital image data with the weighting value of the corresponding pixel of the second digital image data, and in this way, with the use of information about the finer-resolution second digital image data, to form refined first image data.

10. The device according to claim 9, wherein the weighting value-formation device is designed to determine the weighting value on the basis of an additional smoothing of image values in the area of the pixel and its environment, if and only if the difference of the image value of the pixel of the second image data to the image values of the surrounding pixels and/or to the image value, or values, of a part of the surrounding pixels is greater than or equal to, or greater than, a specified limit value.

* * * * *